United States Patent
Davis et al.

(10) Patent No.: US 9,008,079 B2
(45) Date of Patent: Apr. 14, 2015

(54) SYSTEM AND METHOD FOR HIGH-PERFORMANCE, LOW-POWER DATA CENTER INTERCONNECT FABRIC

(71) Applicant: III Holdings 2, LLC, Wilmington, DE (US)

(72) Inventors: Mark Bradley Davis, Austin, TX (US); David James Borland, Austin, TX (US); Barry Ross Evans, Austin, TX (US)

(73) Assignee: III Holdings 2, LLC, Wilmington, DE (US)

( * ) Notice: Subject to any disclaimer, the term of this patent is extended or adjusted under 35 U.S.C. 154(b) by 0 days.

(21) Appl. No.: 13/705,340

(22) Filed: Dec. 5, 2012

(65) Prior Publication Data

US 2013/0094499 A1 Apr. 18, 2013

Related U.S. Application Data

(63) Continuation of application No. 12/794,996, filed on Jun. 7, 2010.

(60) Provisional application No. 61/256,723, filed on Oct. 30, 2009.

(51) Int. Cl.
*H04L 12/50* (2006.01)
*G06F 13/00* (2006.01)
(Continued)

(52) U.S. Cl.
CPC .............. *G06F 13/00* (2013.01); *H04L 45/60* (2013.01); *H04L 49/109* (2013.01); *H04L 49/3009* (2013.01); *H04L 49/351* (2013.01); *H04L 49/356* (2013.01); *H04L 45/00* (2013.01); *H04L 49/25* (2013.01); *G06F 13/24* (2013.01);
(Continued)

(58) Field of Classification Search
CPC ........................................................ G06F 3/24
USPC ............ 370/400; 713/300–400; 710/260–269
See application file for complete search history.

(56) References Cited

U.S. PATENT DOCUMENTS

| | | |
|---|---|---|
| 5,451,936 A | 9/1995 | Yang et al. |
| 5,594,908 A | 1/1997 | Hyatt |

(Continued)

FOREIGN PATENT DOCUMENTS

| | | |
|---|---|---|
| JP | 2005-536960 | 2/2005 |
| JP | 2005-223753 | 8/2005 |

(Continued)

OTHER PUBLICATIONS

An Article entitled "Implementation of an 8-Core, 64-Thread, Power-Efficient SPARC Server on a Chip", Nawathe et al., Jan. 1, 2008, Retrieved from the internet: http://ieeexplore.ieee.org/xpl/login.jsp?tp&arnumber=4443 1998<url=http%3A%2F%Fieeexplore.ieee.org%2Fxpls%2Fabs_all.jsp%3Farnumber%3D4443199.

(Continued)

*Primary Examiner* — Thai Koang
*Assistant Examiner* — Kenneth P Hunt

(57) ABSTRACT

A system and method are provided that support a routing using a tree-like or graph topology that supports multiple links per node, where each link is designated as an Up, Down, or Lateral link, or both, within the topology. The system may use a segmented MAC architecture which may have a method of re-purposing MAC IP addresses for inside MACs and outside MACs, and leveraging what would normally be the physical signaling for the MAC to feed into the switch.

16 Claims, 21 Drawing Sheets

(51) Int. Cl.
| | |
|---|---|
| *H04L 12/773* | (2013.01) |
| *H04L 12/933* | (2013.01) |
| *H04L 12/935* | (2013.01) |
| *H04L 12/931* | (2013.01) |
| *H04L 12/701* | (2013.01) |
| *H04L 12/947* | (2013.01) |
| *G06F 13/24* | (2006.01) |
| *G06F 1/32* | (2006.01) |
| *G06F 13/40* | (2006.01) |
| *H04L 12/801* | (2013.01) |

(52) U.S. Cl.
CPC .............. *G06F 1/3234* (2013.01); *G06F 13/40* (2013.01); *H04L 47/10* (2013.01)

(56) References Cited

U.S. PATENT DOCUMENTS

| | | | |
|---|---|---|---|
| 5,781,187 A | 7/1998 | Gephardt et al. | |
| 5,908,468 A | 6/1999 | Hartmann | |
| 5,968,176 A | 10/1999 | Nessett et al. | |
| 5,971,804 A | 10/1999 | Gallagher et al. | |
| 6,141,214 A | 10/2000 | Ahn | |
| 6,373,841 B1 | 4/2002 | Goh et al. | |
| 6,446,192 B1 | 9/2002 | Narasimhan et al. | |
| 6,452,809 B1 | 9/2002 | Jackson et al. | |
| 6,507,586 B1 | 1/2003 | Satran et al. | |
| 6,574,238 B1 | 6/2003 | Thrysoe | |
| 6,711,691 B1 * | 3/2004 | Howard et al. ............... 713/300 | |
| 6,766,389 B2 | 7/2004 | Hayter et al. | |
| 6,813,676 B1 | 11/2004 | Henry et al. | |
| 6,816,750 B1 | 11/2004 | Klaas | |
| 6,842,430 B1 | 1/2005 | Melnik | |
| 6,963,948 B1 | 11/2005 | Gulick | |
| 6,977,939 B2 | 12/2005 | Joy et al. | |
| 6,988,170 B2 | 1/2006 | Barroso et al. | |
| 6,990,063 B1 | 1/2006 | Lenoski et al. | |
| 7,020,695 B1 | 3/2006 | Kundu et al. | |
| 7,032,119 B2 | 4/2006 | Fung | |
| 7,080,078 B1 | 7/2006 | Slaughter et al. | |
| 7,080,283 B1 | 7/2006 | Songer et al. | |
| 7,143,153 B1 | 11/2006 | Black et al. | |
| 7,165,120 B1 | 1/2007 | Giles et al. | |
| 7,170,315 B2 | 1/2007 | Bakker et al. | |
| 7,203,063 B2 | 4/2007 | Bash et al. | |
| 7,257,655 B1 | 8/2007 | Burney et al. | |
| 7,263,288 B1 | 8/2007 | Islam | |
| 7,274,705 B2 | 9/2007 | Chang et al. | |
| 7,278,582 B1 | 10/2007 | Siegel et al. | |
| 7,310,319 B2 | 12/2007 | Awsienko et al. | |
| 7,325,050 B2 | 1/2008 | O'Connor et al. | |
| 7,337,333 B2 | 2/2008 | O'Conner et al. | |
| 7,340,777 B1 | 3/2008 | Szor | |
| 7,353,362 B2 | 4/2008 | Georgiou et al. | |
| 7,382,154 B2 | 6/2008 | Ramos et al. | |
| 7,386,888 B2 | 6/2008 | Liang et al. | |
| 7,418,534 B2 | 8/2008 | Hayter et al. | |
| 7,437,540 B2 | 10/2008 | Paolucci et al. | |
| 7,447,147 B2 | 11/2008 | Nguyen et al. | |
| 7,447,197 B2 | 11/2008 | Terrell et al. | |
| 7,466,712 B2 | 12/2008 | Makishima et al. | |
| 7,467,306 B2 | 12/2008 | Cartes et al. | |
| 7,467,358 B2 | 12/2008 | Kang et al. | |
| 7,502,884 B1 | 3/2009 | Shah et al. | |
| 7,519,843 B1 | 4/2009 | Buterbaugh et al. | |
| 7,555,666 B2 | 6/2009 | Brundridge et al. | |
| 7,583,661 B2 | 9/2009 | Chaudhuri | |
| 7,586,841 B2 | 9/2009 | Vasseur | |
| 7,596,144 B2 | 9/2009 | Pong | |
| 7,599,360 B2 | 10/2009 | Edsall et al. | |
| 7,606,225 B2 | 10/2009 | Xie et al. | |
| 7,606,245 B2 | 10/2009 | Ma et al. | |
| 7,616,646 B1 | 11/2009 | Ma et al. | |
| 7,620,057 B1 | 11/2009 | Aloni et al. | |
| 7,657,677 B2 | 2/2010 | Huang et al. | |
| 7,657,756 B2 | 2/2010 | Hall | |
| 7,660,931 B2 | 2/2010 | Hayter et al. | |
| 7,673,164 B1 * | 3/2010 | Agarwal ........................ | 713/324 |
| 7,710,936 B2 | 5/2010 | Morales Barroso | |
| 7,719,834 B2 | 5/2010 | Miyamoto et al. | |
| 7,751,433 B2 | 7/2010 | Dollo et al. | |
| 7,760,720 B2 | 7/2010 | Pullela et al. | |
| 7,761,687 B2 | 7/2010 | Blumrich et al. | |
| 7,783,910 B2 | 8/2010 | Felter et al. | |
| 7,791,894 B2 | 9/2010 | Bechtolsheim | |
| 7,796,399 B2 | 9/2010 | Clayton et al. | |
| 7,801,132 B2 | 9/2010 | Ofek et al. | |
| 7,802,017 B2 | 9/2010 | Uemura et al. | |
| 7,831,839 B2 | 11/2010 | Hatakeyama | |
| 7,840,703 B2 | 11/2010 | Arimilli et al. | |
| 7,865,614 B2 | 1/2011 | Lu et al. | |
| 7,962,771 B2 * | 6/2011 | Song et al. .................... | 713/300 |
| 7,975,110 B1 | 7/2011 | Spaur et al. | |
| 7,991,817 B2 | 8/2011 | Dehon et al. | |
| 7,991,922 B2 | 8/2011 | Hayter et al. | |
| 7,992,151 B2 | 8/2011 | Warrier et al. | |
| 8,019,832 B2 | 9/2011 | De Sousa et al. | |
| 8,060,760 B2 | 11/2011 | Shetty et al. | |
| 8,060,775 B1 * | 11/2011 | Sharma et al. ............... | 714/5.11 |
| 8,108,508 B1 | 1/2012 | Goh et al. | |
| 8,122,269 B2 * | 2/2012 | Houlihan et al. ............. | 713/320 |
| 8,132,034 B2 | 3/2012 | Lambert et al. | |
| 8,156,362 B2 * | 4/2012 | Branover et al. ............. | 713/330 |
| 8,170,040 B2 | 5/2012 | Konda | |
| 8,180,996 B2 | 5/2012 | Fullerton et al. | |
| 8,189,612 B2 | 5/2012 | Lemaire et al. | |
| 8,199,636 B1 | 6/2012 | Rouyer et al. | |
| 8,205,103 B2 | 6/2012 | Kazama et al. | |
| 8,379,425 B2 | 2/2013 | Fukuoka et al. | |
| 8,397,092 B2 | 3/2013 | Karnowski | |
| 8,684,802 B1 | 4/2014 | Gross et al. | |
| 8,745,275 B2 | 6/2014 | Ikeya et al. | |
| 8,745,302 B2 | 6/2014 | Davis et al. | |
| 8,782,321 B2 | 7/2014 | Harriman et al. | |
| 8,824,485 B2 | 9/2014 | Biswas et al. | |
| 8,854,831 B2 | 10/2014 | Arnouse | |
| 2002/0004912 A1 | 1/2002 | Fung | |
| 2002/0040391 A1 | 4/2002 | Chaiken et al. | |
| 2002/0083352 A1 | 6/2002 | Fujimoto et al. | |
| 2002/0097732 A1 | 7/2002 | Worster et al. | |
| 2002/0107903 A1 | 8/2002 | Richter et al. | |
| 2002/0124128 A1 | 9/2002 | Qiu | |
| 2002/0159452 A1 | 10/2002 | Foster et al. | |
| 2002/0186656 A1 | 12/2002 | Vu | |
| 2002/0194412 A1 | 12/2002 | Bottom | |
| 2003/0007493 A1 | 1/2003 | Oi et al. | |
| 2003/0033547 A1 | 2/2003 | Larson et al. | |
| 2003/0041266 A1 | 2/2003 | Ke et al. | |
| 2003/0076832 A1 | 4/2003 | Ni | |
| 2003/0093624 A1 | 5/2003 | Arimilli et al. | |
| 2003/0110262 A1 | 6/2003 | Hasan et al. | |
| 2003/0140190 A1 | 7/2003 | Mahony et al. | |
| 2003/0158940 A1 | 8/2003 | Leigh | |
| 2003/0172191 A1 | 9/2003 | Williams | |
| 2003/0202520 A1 | 10/2003 | Witkowski et al. | |
| 2003/0231624 A1 | 12/2003 | Alappat et al. | |
| 2004/0030938 A1 | 2/2004 | Barr et al. | |
| 2004/0068676 A1 | 4/2004 | Larson et al. | |
| 2004/0141521 A1 | 7/2004 | George | |
| 2004/0165588 A1 | 8/2004 | Pandya | |
| 2004/0210693 A1 | 10/2004 | Zeitler et al. | |
| 2004/0215991 A1 | 10/2004 | McAfee et al. | |
| 2004/0267486 A1 | 12/2004 | Percer et al. | |
| 2005/0015378 A1 | 1/2005 | Gammel et al. | |
| 2005/0018604 A1 | 1/2005 | Dropps et al. | |
| 2005/0018606 A1 | 1/2005 | Dropps et al. | |
| 2005/0021606 A1 | 1/2005 | Davies et al. | |
| 2005/0044195 A1 | 2/2005 | Westfall | |
| 2005/0077921 A1 | 4/2005 | Percer et al. | |
| 2005/0105538 A1 | 5/2005 | Perera et al. | |
| 2005/0240688 A1 | 10/2005 | Moerman et al. | |
| 2006/0013218 A1 | 1/2006 | Shore et al. | |
| 2006/0029053 A1 | 2/2006 | Roberts et al. | |
| 2006/0090025 A1 | 4/2006 | Tufford et al. | |

(56) References Cited

U.S. PATENT DOCUMENTS

| | | | |
|---|---|---|---|
| 2006/0136570 A1 | 6/2006 | Pandya | |
| 2006/0140211 A1 | 6/2006 | Huang et al. | |
| 2006/0174342 A1 | 8/2006 | Zaheer et al. | |
| 2006/0248359 A1 | 11/2006 | Fung | |
| 2006/0259734 A1 | 11/2006 | Sheu et al. | |
| 2006/0265609 A1 | 11/2006 | Fung | |
| 2007/0006001 A1 | 1/2007 | Isobe et al. | |
| 2007/0076653 A1 | 4/2007 | Park et al. | |
| 2007/0094486 A1 | 4/2007 | Moore et al. | |
| 2007/0109968 A1 | 5/2007 | Hussain et al. | |
| 2007/0130397 A1 | 6/2007 | Tsu | |
| 2007/0180310 A1* | 8/2007 | Johnson et al. | 714/12 |
| 2007/0226795 A1 | 9/2007 | Conti et al. | |
| 2007/0280230 A1 | 12/2007 | Park | |
| 2007/0286009 A1 | 12/2007 | Norman | |
| 2007/0288585 A1 | 12/2007 | Sekiguchi et al. | |
| 2008/0013453 A1 | 1/2008 | Chiang et al. | |
| 2008/0040463 A1 | 2/2008 | Brown et al. | |
| 2008/0052437 A1 | 2/2008 | Loffink et al. | |
| 2008/0059782 A1 | 3/2008 | Kruse et al. | |
| 2008/0075089 A1 | 3/2008 | Evans et al. | |
| 2008/0089358 A1 | 4/2008 | Basso et al. | |
| 2008/0104264 A1 | 5/2008 | Duerk et al. | |
| 2008/0140771 A1 | 6/2008 | Vass et al. | |
| 2008/0140930 A1 | 6/2008 | Hotchkiss | |
| 2008/0162691 A1 | 7/2008 | Zhang et al. | |
| 2008/0183882 A1 | 7/2008 | Flynn et al. | |
| 2008/0199133 A1 | 8/2008 | Takizawa et al. | |
| 2008/0212273 A1 | 9/2008 | Bechtolsheim | |
| 2008/0212276 A1 | 9/2008 | Bottom et al. | |
| 2008/0217021 A1 | 9/2008 | Lembcke et al. | |
| 2008/0222434 A1 | 9/2008 | Shimizu et al. | |
| 2008/0235443 A1 | 9/2008 | Chow et al. | |
| 2008/0243634 A1 | 10/2008 | Dworkin et al. | |
| 2008/0250181 A1 | 10/2008 | Li et al. | |
| 2008/0259555 A1 | 10/2008 | Bechtolsheim et al. | |
| 2008/0266793 A1 | 10/2008 | Lee | |
| 2008/0288660 A1 | 11/2008 | Balasubramanian et al. | |
| 2008/0288664 A1 | 11/2008 | Pettey et al. | |
| 2008/0288683 A1 | 11/2008 | Ramey | |
| 2008/0301794 A1 | 12/2008 | Lee | |
| 2008/0320161 A1 | 12/2008 | Maruccia et al. | |
| 2009/0021907 A1 | 1/2009 | Mann et al. | |
| 2009/0044036 A1 | 2/2009 | Merkin | |
| 2009/0064287 A1 | 3/2009 | Bagepalli et al. | |
| 2009/0080428 A1 | 3/2009 | Witkowski et al. | |
| 2009/0097200 A1 | 4/2009 | Sharma et al. | |
| 2009/0113130 A1 | 4/2009 | He et al. | |
| 2009/0135751 A1 | 5/2009 | Hodges et al. | |
| 2009/0135835 A1 | 5/2009 | Gallatin et al. | |
| 2009/0158070 A1 | 6/2009 | Gruendler | |
| 2009/0172423 A1* | 7/2009 | Song et al. | 713/300 |
| 2009/0198958 A1 | 8/2009 | Arimilli et al. | |
| 2009/0204834 A1 | 8/2009 | Hendin et al. | |
| 2009/0204837 A1 | 8/2009 | Raval et al. | |
| 2009/0219827 A1 | 9/2009 | Chen et al. | |
| 2009/0222884 A1 | 9/2009 | Shaji et al. | |
| 2009/0225751 A1 | 9/2009 | Koenck et al. | |
| 2009/0235104 A1 | 9/2009 | Fung | |
| 2009/0248943 A1 | 10/2009 | Jiang et al. | |
| 2009/0259863 A1 | 10/2009 | Williams et al. | |
| 2009/0259864 A1 | 10/2009 | Li et al. | |
| 2009/0265045 A1 | 10/2009 | Coxe, III | |
| 2009/0271656 A1 | 10/2009 | Yokota et al. | |
| 2009/0276666 A1 | 11/2009 | Haley et al. | |
| 2009/0279518 A1 | 11/2009 | Falk et al. | |
| 2009/0282274 A1 | 11/2009 | Langgood et al. | |
| 2009/0282419 A1 | 11/2009 | Mejdrich et al. | |
| 2010/0005331 A1 | 1/2010 | Somasundaram et al. | |
| 2010/0008038 A1 | 1/2010 | Coglitore | |
| 2010/0026408 A1 | 2/2010 | Shau | |
| 2010/0040053 A1 | 2/2010 | Gottumukkula et al. | |
| 2010/0049822 A1 | 2/2010 | Davies et al. | |
| 2010/0051391 A1 | 3/2010 | Jahkonen | |
| 2010/0106987 A1 | 4/2010 | Lambert et al. | |
| 2010/0118880 A1 | 5/2010 | Kunz et al. | |
| 2010/0125915 A1 | 5/2010 | Hall et al. | |
| 2010/0169479 A1 | 7/2010 | Jeong et al. | |
| 2010/0220732 A1 | 9/2010 | Hussain et al. | |
| 2010/0250914 A1 | 9/2010 | Abdul et al. | |
| 2010/0265650 A1 | 10/2010 | Chen et al. | |
| 2010/0281246 A1 | 11/2010 | Bristow et al. | |
| 2010/0299548 A1 | 11/2010 | Chadirchi et al. | |
| 2010/0308897 A1 | 12/2010 | Evoy et al. | |
| 2010/0312910 A1* | 12/2010 | Lin et al. | 709/238 |
| 2010/0312969 A1 | 12/2010 | Yamazaki et al. | |
| 2010/0318812 A1 | 12/2010 | Auradkar et al. | |
| 2011/0023104 A1 | 1/2011 | Franklin | |
| 2011/0029652 A1 | 2/2011 | Chhuor et al. | |
| 2011/0075369 A1 | 3/2011 | Sun et al. | |
| 2011/0090633 A1 | 4/2011 | Rabinovitz | |
| 2011/0103391 A1 | 5/2011 | Davis et al. | |
| 2011/0191514 A1 | 8/2011 | Wu et al. | |
| 2011/0191610 A1 | 8/2011 | Agarwal et al. | |
| 2011/0210975 A1 | 9/2011 | Wong et al. | |
| 2011/0271159 A1 | 11/2011 | Ahn et al. | |
| 2011/0273840 A1 | 11/2011 | Chen | |
| 2011/0295991 A1 | 12/2011 | Aida | |
| 2011/0296141 A1 | 12/2011 | Daffron | |
| 2011/0320690 A1 | 12/2011 | Petersen et al. | |
| 2012/0020207 A1 | 1/2012 | Corti et al. | |
| 2012/0050981 A1 | 3/2012 | Xu et al. | |
| 2012/0054469 A1 | 3/2012 | Ikeya et al. | |
| 2012/0081850 A1 | 4/2012 | Regimbal et al. | |
| 2012/0096211 A1 | 4/2012 | Davis et al. | |
| 2012/0099265 A1 | 4/2012 | Reber | |
| 2012/0155168 A1 | 6/2012 | Kim et al. | |
| 2012/0198252 A1 | 8/2012 | Kirschtein et al. | |
| 2013/0010639 A1 | 1/2013 | Armstrong et al. | |
| 2013/0094499 A1 | 4/2013 | Davis et al. | |
| 2013/0097448 A1 | 4/2013 | Davis et al. | |
| 2013/0148667 A1 | 6/2013 | Hama et al. | |
| 2013/0163605 A1 | 6/2013 | Chandra et al. | |
| 2013/0290650 A1 | 10/2013 | Chang et al. | |

FOREIGN PATENT DOCUMENTS

| | | |
|---|---|---|
| WO | WO2004/021641 | 3/2004 |
| WO | WO-2005/013143 | 2/2005 |
| WO | WO-2008/000193 | 1/2008 |
| WO | WO-2011/044271 | 4/2011 |
| WO | WO-2012/037494 | 3/2012 |

OTHER PUBLICATIONS

Nawathe et al., "Implementation of an 8-Core, 64-Thread, Power-Efficient SPARC Server on a Chip", IEEE Journal of Solid-State Circuits, vol. 43, No. 1, Jan. 2008.

Final Office Action on U.S. Appl. No. 13/475,722, mailed Oct. 20, 2014.

Non-Final Office Action on U.S. Appl. No. 12/889,721, mailed Sep. 29, 2014.

Non-Final Office Action on U.S. Appl. No. 13/234,054, mailed Oct. 23, 2014.

Final Office Action on U.S. Appl. No. 13/527,498, mailed Nov. 17, 2014.

Non-Final Office Action on U.S. Appl. No. 13/662,759, mailed Nov. 6, 2014.

Advanced Switching Technology Tech Brief, published 2005, 2 pages.

Chapter 1 Overview of the Origin Family Architecture from Origin and Onyx2 Theory of Operations Manual, published 1997, 18 pages.

Cisco MDS 9000 Family Multiprotocol Services Module, published 2006, 13 pages.

Comparing the I2C BUS to the SMBUS, Maxim Integrated, Dec. 1, 2000, p. 1.

Deering, "IP Multicast Extensions for 4.3BSD UNIX and related Systems," Jun. 1999, 5 pages.

Extended European Search Report for EP 10827330.1, mailed Jun. 5, 2013.

Final Office Action on U.S. Appl. No. 12/889,721, mailed Apr. 17, 2014.

(56) References Cited

OTHER PUBLICATIONS

Final Office Action on U.S. Appl. No. 12/794,996, mailed Jun. 19, 2013.
Final Office Action on U.S. Appl. No. 13/624,725, mailed Nov. 13, 2013.
Final Office Action on U.S. Appl. No. 13/624,731, mailed Jul. 25, 2014.
Final Office Action on U.S. Appl. No. 13/705,414, mailed Aug. 9, 2013.
Final Office Action on U.S. Appl. No. 13/624,731, mailed Nov. 12, 2013.
fpga4fun.com,"What is JTAG?", 2 pages, Jan. 31, 2010.
From AT to BTX: Motherboard Form Factor, Webopedia, Apr. 29, 2005, p. 1.
HP Virtual Connect Traffic Flow—Technology brief, Jan. 2012, 22 pages.
International Preliminary Report on Patentability for PCT/US2009/044200, mailed Nov. 17, 2010.
International Preliminary Report on Patentability for PCT/US2012/038986 issued on Nov. 26, 2013.
International Preliminary Report on Patentability for PCT/US2012/061747, mailed Apr. 29, 2014.
International Preliminary Report on Patentability issued on PCT/US12/62608, issued May 6, 2014.
International Search Report and Written Opinion for PCT/US12/61747, mailed Mar. 1, 2013.
International Search Report and Written Opinion for PCT/US12/62608, mailed Jan. 18, 2013.
International Search Report and Written Opinion for PCT/US2011/051996, mailed Jan. 19, 2012.
International Search Report and Written Opinion on PCT/US09/44200, mailed Jul. 1, 2009.
International Search Report and Written Opinion on PCT/US2012/038986, mailed Mar. 14, 2013.
Jansen et al., "SATA-IO to Develop Specification for Mini Interface Connector" Press Release Sep. 21, 2009, Serial ATA3 pages.
Non-Final Action on U.S. Appl. No. 13/728,362, mailed Feb. 21, 2014.
Non-Final Office Action on U.S. Appl. No. 12/889,721, mailed Jul. 2, 2013.
Non-Final Office Action on U.S. Appl. No. 13/475,722, mailed Jan. 17, 2014.
Non-Final Office Action on U.S. Appl. No. 12/794,996, mailed Sep. 17, 2012.
Non-Final Office Action on U.S. Appl. No. 12/889,721, mailed Oct. 11, 2012.
Non-Final Office Action on U.S. Appl. No. 13/284,855, mailed Dec. 19, 2013.
Non-Final Office Action on U.S. Appl. No. 13/453,086, mailed Mar. 12, 2013.
Non-Final Office Action on U.S. Appl. No. 13/475,713, mailed Apr. 1, 2014.
Non-Final Office Action on U.S. Appl. No. 13/527,505, mailed May 8, 2014.
Non-Final Office Action on U.S. Appl. No. 13/527,498, Mailed May 8, 2014.
Non-Final Office Action on U.S. Appl. No. 13/624,725, mailed Jan. 10, 2013.
Non-final office action on U.S. Appl. No. 13/624,731 mailed Jan. 29, 2013.
Non-Final Office Action on U.S. Appl. No. 13/692,741, mailed Sep. 4, 2014.
Non-Final Office Action on U.S. Appl. No. 13/705,286, mailed May 13, 2013.
Non-Final Office Action on U.S. Appl. No. 13/705,414, mailed Apr. 9, 2013.
Non-Final Office Action on U.S. Appl. No. 13/705,428, mailed Jul. 10, 2013.
Notice of Allowance on U.S. Appl. No. 13/453,086, mailed Jul. 18, 2013.
Notice of Allowance on U.S. Appl. No. 13/705,386, mailed Jan. 24, 2014.
Notice of Allowance on U.S. Appl. No. 13/705,414, mailed Nov. 4, 2013.
Notice of Allowance on U.S. Appl. No. 13/284,855, mailed Jul. 14, 2014.
Venaas, "IPv4 Multicast Address Space Registry," 2013, http://www.iana.org/assignments/multicast-addresses/multicast-addresses.xhtml.
Final Office Action on U.S. Appl. No. 13/527,505, mailed Dec. 5, 2014.
Notice of Allowance on U.S. Appl. No. 13/475,713, mailed Feb. 5, 2015.
Reexamination Report on Japanese Application 2012-536877, mailed Jan. 22, 2015 (English Translation not available).
Elghany et al., "High Throughput High Performance NoC Switch," NORCHIP 2008, Nov. 2008, pp. 237-240.
Grecu et al., "A Scalable Communication-Centric SoC Interconnect Architecture" Proceedings 5th International Symposium on Quality Electronic Design, 2005, pp. 343, 348 (full article included).
Hossain et al., "Extended Butterfly Fat Tree Interconnection (EFTI) Architecture for Network on Chip," 2005 IEEE Pacific Rim Conference on Communications, Computers and Signal Processing, Aug. 2005, pp. 613-616.
Non-Final Office Action on U.S. Appl. No. 14/334,931, mailed Jan. 5, 2015.
Pande et al., "Design of a Switch for Network on Chip Applications," May 25-28, 2003 Proceedings of the 2003 International Symposium on Circuits and Systems, vol. 5, pp. V217-V220.
Non-Final Office Action on U.S. Appl. No. 14/106,698, mailed Feb. 12, 2015.
Notice of Allowance on U.S. Appl. No. 13/527,498, mailed Feb. 23, 2015.
Search Report on EP Application 10827330.1, mailed Feb. 12, 2015.

\* cited by examiner

SYSTEM AND METHOD FOR HIGH-PERFORMANCE, LOW-POWER DATA CENTER INTERCONNECT FABRIC

CROSS REFERENCE TO RELATED APPLICATIONS

This continuation patent application claims priority to co-pending U.S. Non-Provisional patent application Ser. No. 12/794,996 filed Jun. 7, 2010 entitled "SYSTEM AND METHOD FOR HIGH-PERFORMANCE, LOW-POWER DATA CENTER INTERCONNECT FABRIC", which claims priority to U.S. Provisional Patent Application Ser. No. 61/256,723 filed Oct. 30, 2009 entitled "SYSTEM AND METHOD FOR ENHANCED COMMUNICATIONS IN A MULTI-PROCESSOR SYSTEM ON A CHIP (SOC)", both of these applications having a common applicant herewith and being incorporated herein in their entirety by reference.

FIELD

The disclosure relates generally to a switching fabric for a computer-based system.

BACKGROUND

With the continued growth of the internet, web-based companies and systems and the proliferation of computers, there are numerous data centers that house multiple server computers in a location that is temperature controlled and can be externally managed as is well known.

FIGS. 1A and 1B show a classic data center network aggregation as is currently well known. FIG. 1A shows a diagrammatical view of a typical network data center architecture 100 wherein top level switches 101a-n are at the tops of racks 102a-n filled with blade servers 107a-n interspersed with local routers 103a-f. Additional storage routers and core switches. 105a-b and additional rack units 108a-n contain additional servers 104e-k and routers 106a-g FIG. 1b shows an exemplary physical view 110 of a system with peripheral servers 111a-bn arranged around edge router systems 112a-h, which are placed around centrally located core switching systems 113. Typically such an aggregation 110 has 1-Gb Ethernet from the rack servers to their top of rack switches, and often 10 Gb Ethernet ports to the edge and core routers.

However, what is needed is a system and method for packet switching functionality focused on network aggregation that reduces size and power requirements of typical systems while reducing cost all at the same time and it is to this end that the disclosure is directed.

DETAILED DESCRIPTION OF ONE OR MORE EMBODIMENTS

The disclosure is particularly applicable to a network aggregation system and method as illustrated and described below and it is in this context that the disclosure will be described. It will be appreciated, however, that the system and method has greater utility since the system and method can be implemented using other elements and architectures that are within the scope of the disclosure and the disclosure is not limited to the illustrative embodiments described below.

The system and method also supports a routing using a tree-like or graph topology that supports multiple links per node, where each link is designated as an Up, Down, or Lateral link, or both, within the topology. In addition, each node in the system maybe be a combination computational/switch node, or just a switch node, and input/output (I/O) can reside on any node as described below in more detail. The system may also provide a system with a segmented Ethernet Media Access Control (MAC) architecture which may have a method of re-purposing MAC Internet Protocol (IP) addresses for inside MACs and outside MACs, and leveraging what would normally be the physical signaling for the MAC to feed into the switch. The system may also provide a method of non-spoofing communication, as well as a method of fault-resilient broadcasting, which may have a method of unicast misrouting for fault resilience. In the context of network security, a spoofing attack is a situation in which one person or program successfully masquerades as another by falsifying data and thereby gaining an illegitimate advantage.

The system may also provide a rigorous security between the management processors, such that management processors can "trust" one another. In the example system shown in FIG. 5A (which is described below in more detail), there is a management processor within each SoC (the M3 microcontroller, block 906, FIG. 5A). The software running on the management processor is trusted because a) the vendor (in this case Smooth-Stone) has developed and verified the code, b) non-vendor code is not allowed to run on the processor. Maintaining a Trust relationship between the management processors allow them to communicate commands (e.g.

reboot another node) or request sensitive information from another node without worrying that a user could spoof the request and gain access to information or control of the system.

The system may also provide a network proxy that has an integrated microcontroller in an always-on power domain within a system on a chip (SOC) that can take over network proxying for the larger onboard processor, and which may apply to a subtree. The system also provide a multi-domaining technique that can dramatically expand the size of a routable fat tree like structure with only trivial changes to the routing header and the routing table.

Figure 1A:
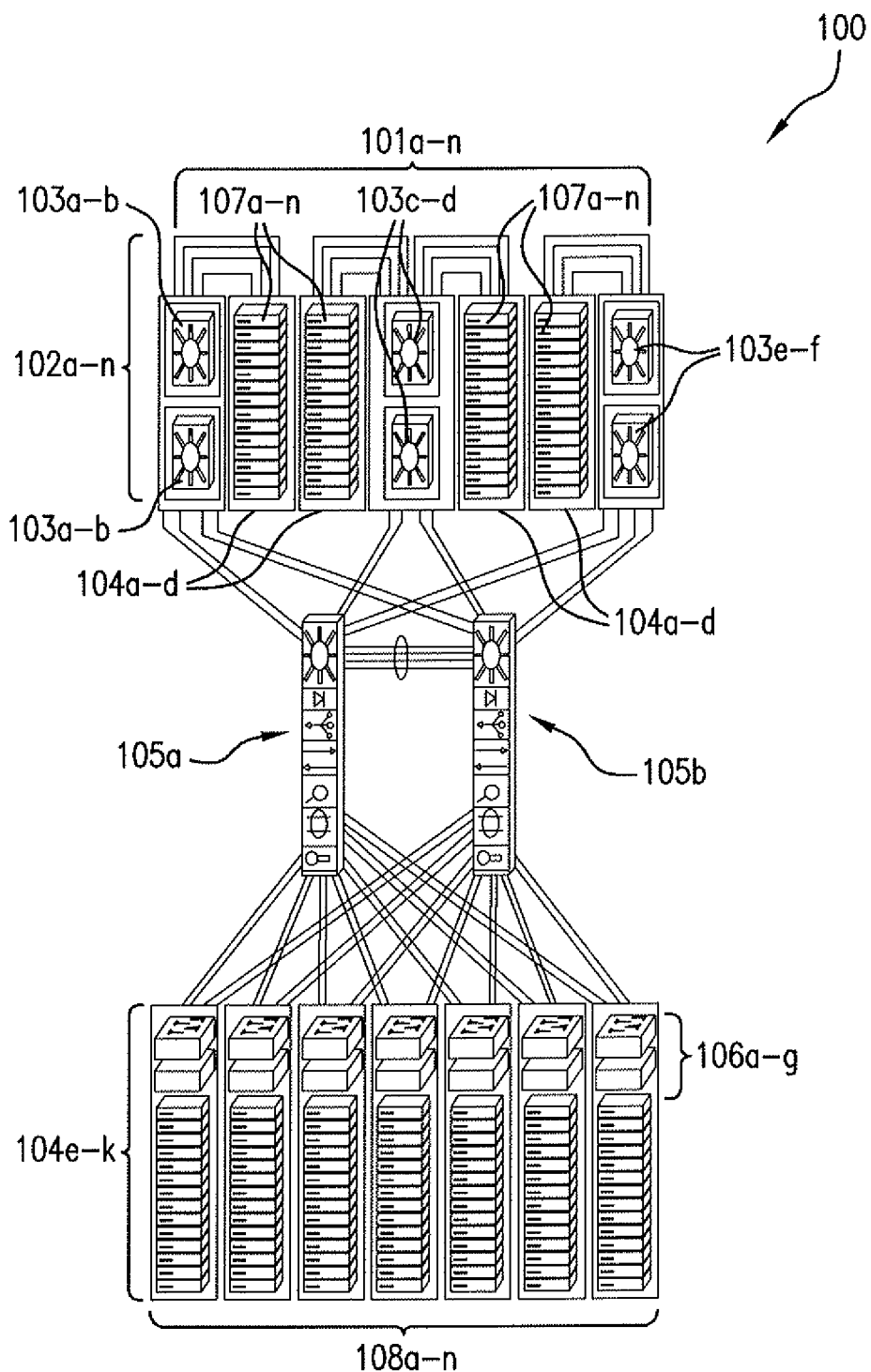
FIGS. 1A and 1B illustrate a typical data center system.
Figure 1B:
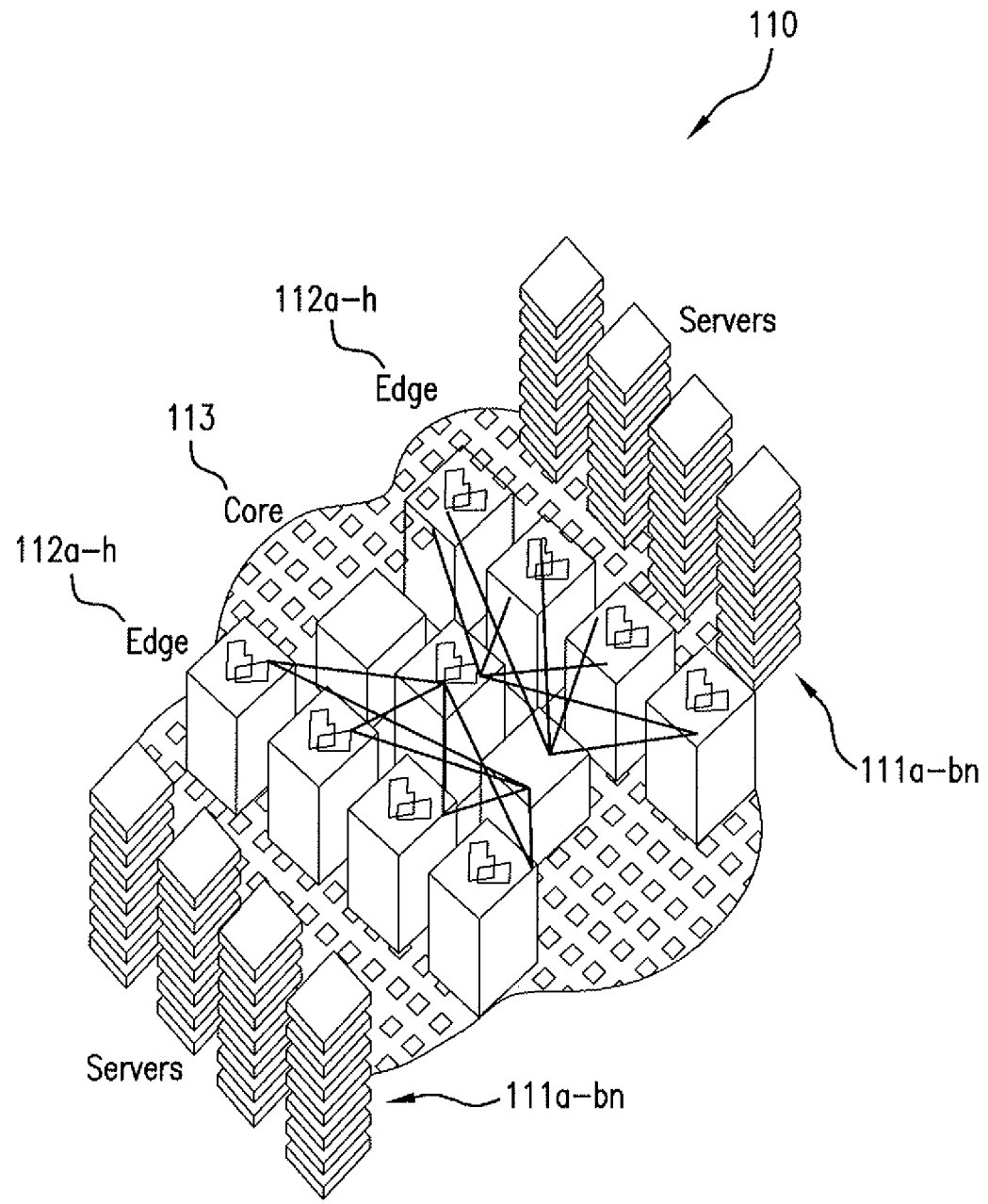
Figure 2A:
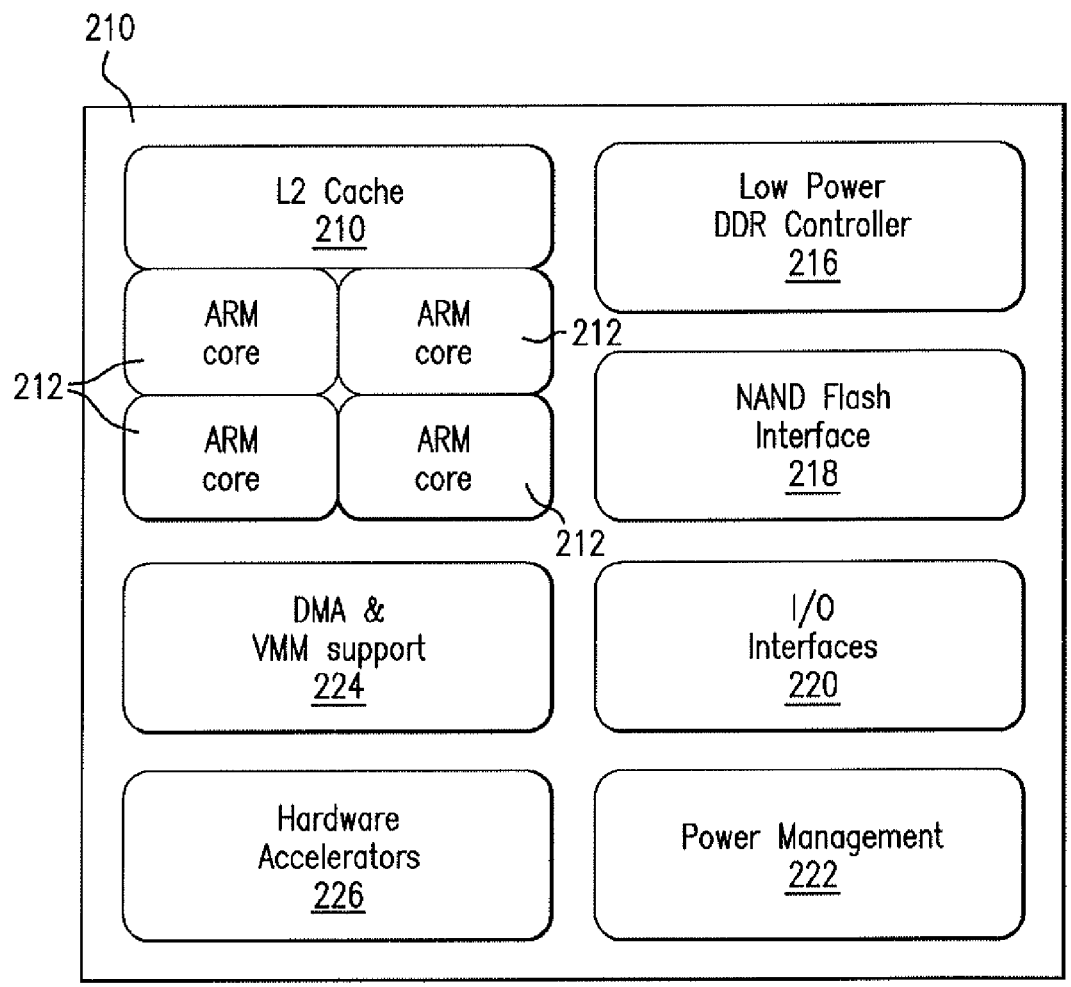
FIG. 2A illustrates a computing unit that may include a universal address system and method.

FIG. 2A illustrates a computing unit 210 that is part of a distributed computing system and may include a universal address system and method. In one embodiment, each computing unit may be implemented on a single integrated circuit as shown in FIG. 2A. Each computing unit 210 may include one or more processing cores 212, such as ARM processing cores, and an associated cache memory 214, a DDR controller 216, a not AND logic (NAND) flash memory interface 218, I/O interfaces 220, a power management portion 222, a direct memory access (DMA)/virtual memory management (VMM) support unit 224 described in more detail below and one or more hardware accelerators 226.

Figure 2B:
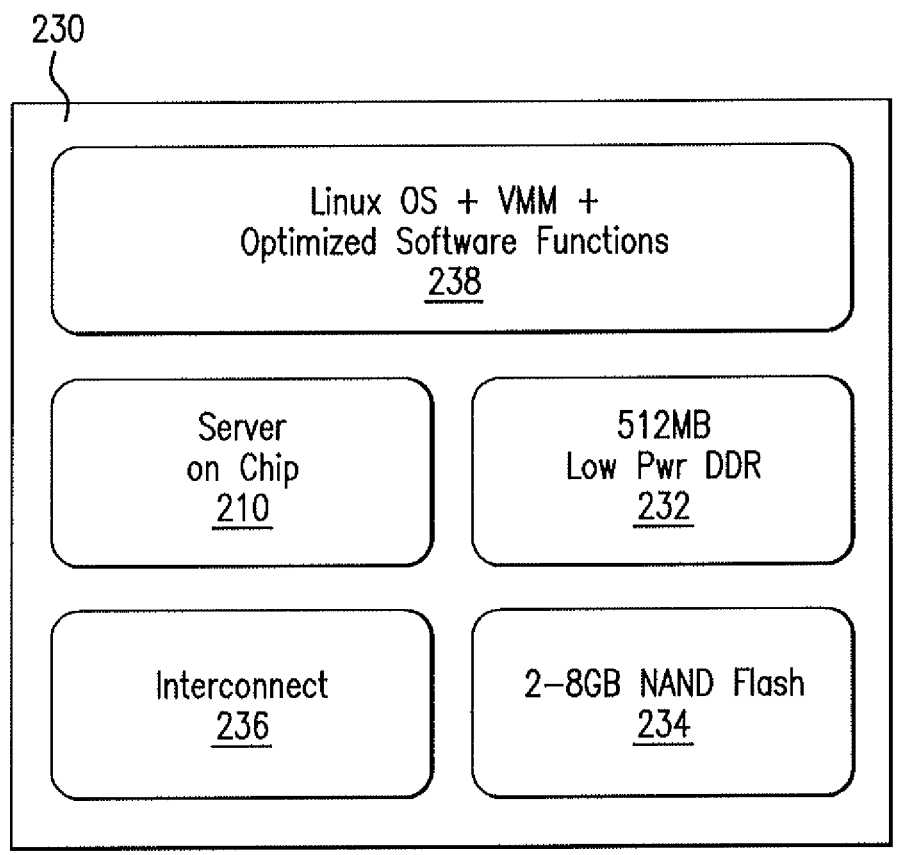
FIG. 2B illustrates a computing system that may include a universal address system and method.

FIG. 2B illustrates a distributed computing system 230 that may include a universal address system and method. Each computing system 230 may be a node in a processing system in which a plurality of nodes are connected to each other over a link, such as a network. In addition to the computing unit 210, each computing system 230 may further comprise double data rate (DDR) low power RAM 232, such as 512 Mb of low power DDR RAM in one embodiment, which is direct access memory to the computing system, NAND flash memory 234, such as 2-8 Gb of NAND flash memory in one embodiment, that acts as persistent storage and stores a file system, an interconnect 236 that connects this computing system to the other computing systems over a link, such as a computer network, and software 238, such as a Linux operating system, virtual memory management (VMM) software and one or more optimized software functions. In one embodiment, the universal address system is implemented using the DMA and VMM support 224 of each computing unit 224 (See FIG. 2A) in combination with the VMM software 238 (shown in FIG. 2B). The DMA of the computing unit is a standard mechanism (common in many systems), which can be given a data movement task to perform by the system. In this scenario, such a standard module would be told to copy a page of data via the IO links to the local memory and then to report. The VMM support is a similarly standard function consisting of both software and hardware that is used to check every memory access and convert the virtual page to a physical page reference. In this scenario, the existing mechanisms would use as the first level of the extended mechanism and the VMM software would be used to further translate from local physical page to universal address.

Figure 2C:
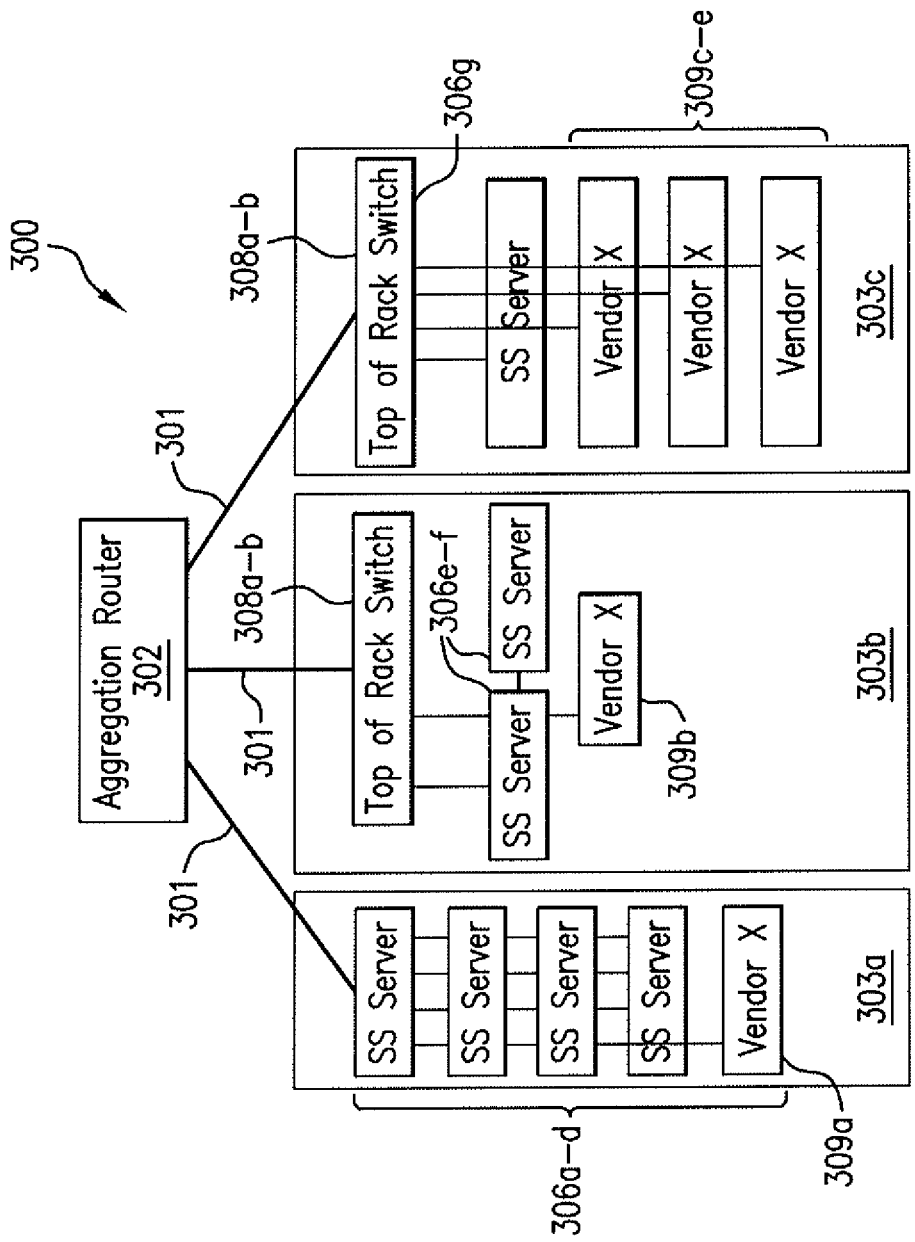
FIG. 2C is an overview of a network aggregation system.
Figure 3:
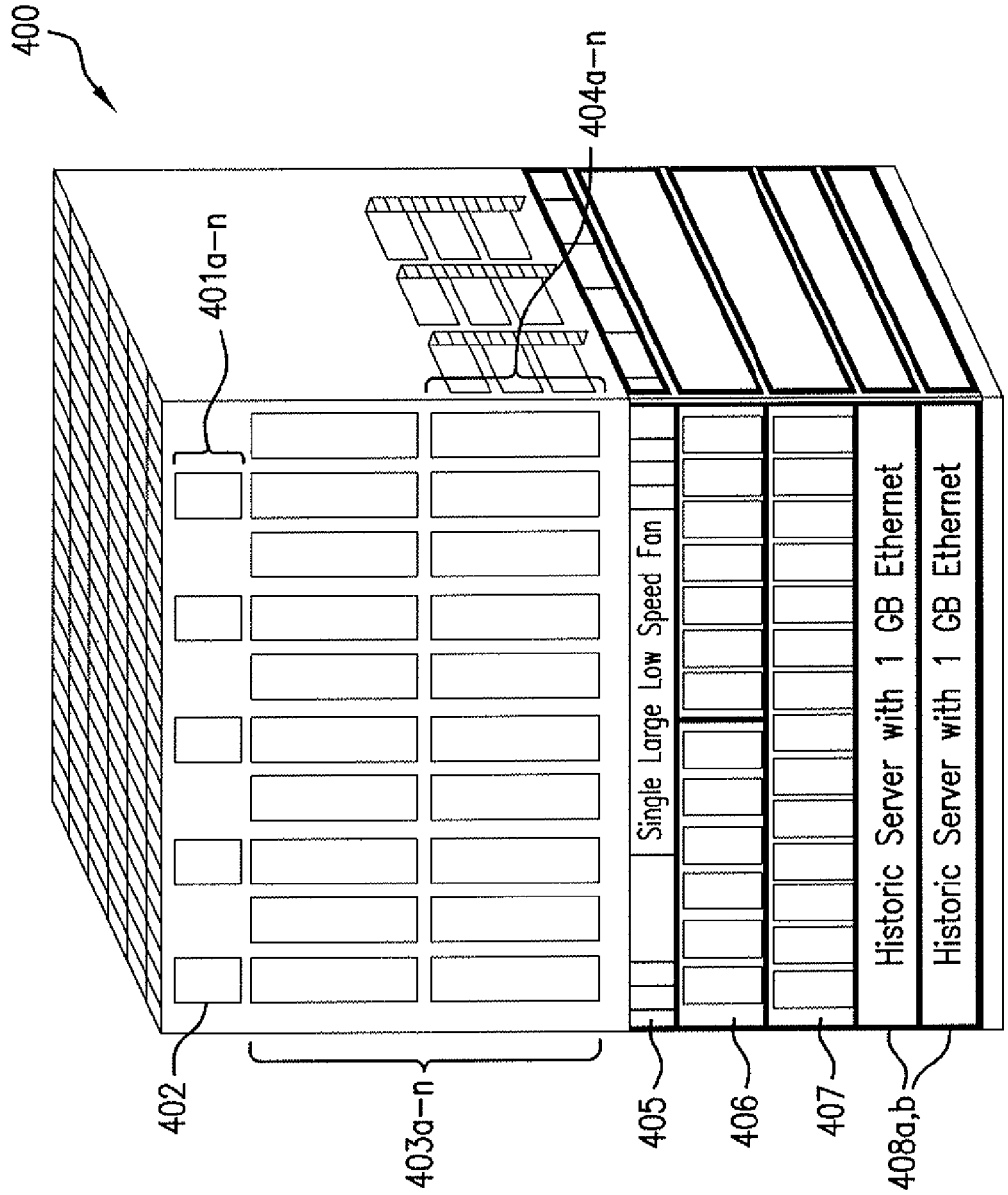
FIG. 3 illustrates an overview of an exemplary data center in a rack system.

FIG. 2C illustrates a network aggregation system 300. The network aggregation supports one or more high speed links 301 (thick lines), such as a 10-Gb/sec Ethernet communication, that connect an aggregation router 302 and one or more racks 303, such as three racks 303a-c as shown in FIG. 3. In a first rack 303a, the network aggregation system provides multiple high-speed 10 Gb paths, represented by thick lines, between one or more Smooth-Stone computing unit 306a-d, such as server computers, on shelves within a rack. Further details of each Smooth-Stone computing unit are described in more detail in U.S. Provisional Patent Application Ser. No. 61/256,723 filed on Oct. 30, 2009 and entitled "System and Method for Enhanced Communications in a Multi-Processor System of a Chip (SOC)" which is incorporated herein in its entirety by reference. An embedded switch 306a-d in the Smooth-Stone computing units can replace a top-of-rack switch, thus saving a dramatic amount of power and cost, while still providing a 10 Gb Ethernet port to the aggregation router 302. The network aggregation system switching fabric can integrate traditional Ethernet (1 Gb or 10 Gb) into the XAUI fabric, and the Smooth-Stone computing units can act as a top of rack switch for third-party Ethernet connected servers.

A middle rack 303b illustrates another configuration of a rack in the network aggregation system in which one or more Smooth-Stone computing units 306e, f can integrate into existing data center racks that already contain a top-of-rack switch 308a. In this case, the IT group can continue to have their other computing units connected via 1 Gb Ethernet up to the existing top-of-rack switch and the internal Smooth-Stone computing units can be connected via 10 Gb XAUI fabric and they can integrate up to the existing top-of-rack switch with either a 1 Gb or 10 Gb Ethernet interconnects as shown in FIG. 2C. A third rack 303c illustrates a current way that data center racks are traditionally deployed. The thin lines in the third rack 303c represent 1 Gb Ethernet. Thus, the current deployments of data center racks is traditionally 1 Gb Ethernet up to the top-of-rack switch 308b, and then 10 Gb (thick line 301) out from the top of rack switch to the aggregation router. Note that all servers are present in an unknown quantity, while they are pictured here in finite quantities for purposes of clarity and simplicity. Also, using the enhanced SS servers, no additional routers are needed, as they operate their own XAUI switching fabric, discussed below.

FIG. 3 shows an overview of an exemplary "data center in a rack" 400 according to one embodiment of the system. The "data center in a rack" 400 may have 10-Gb Ethernet PHY 401a-n and 1-Gb private Ethernet PHY 402. Large computers (power servers) 403a-n support search; data mining; indexing; Apache Hadoop, a Java software framework; MapReduce, a software framework introduced by Google to support distributed computing on large data sets on clusters of computers; cloud applications; etc. Computers (servers) 404a-n with local flash and/or solid-state disk (SSD) support search, MySQL, CDN, software-as-a-service (SaaS), cloud applications, etc. A single, large, slow-speed fan 405 augments the convection cooling of the vertically mounted servers above it. Data center 400 has an array 406 of hard disks, e.g., in a Just a Bunch of Disks (JBOD) configuration, and, optionally, Smooth-Stone computing units in a disk form factor (for example, the green boxes in arrays 406 and 407), optionally acting as disk controllers. Hard disk servers or SS disk servers may be used for web servers, user applications, and cloud applications, etc. Also shown are an array 407 of storage servers and historic servers 408a, b (any size, any vendor) with standard Ethernet interfaces for legacy applications.

The data center in a rack 400 uses a proprietary system interconnect approach that dramatically reduces power and wires and enables heterogeneous systems, integrating existing Ethernet-based servers and enabling legacy applications. In one aspect, a complete server or storage server is put in a disk or SSD form factor, with 8-16 SATA interfaces with 4 ServerNodes™ and 8 PCIe x4 interfaces with 4 ServerNodes™. It supports disk and/or SSD+ServerNode™, using a proprietary board paired with a disk(s) and supporting Web server, user applications, cloud applications, disk caching, etc.

The Smooth-Stone XAUI system interconnect reduces power, wires and the size of the rack. There is no need for high powered, expensive Ethernet switches and high-power Ethernet Phys on the individual servers. It dramatically reduces cables (cable complexity, costs, significant source of failures). It also enables a heterogeneous server mixture inside the rack, supporting any equipment that uses Ethernet or SATA or PCIe. It can be integrated into the system interconnect.

The herein presented aspects of a server-on-a-chip (SOC) with packet switch functionality are focused on network aggregation. The SOC is not a fully functionally equivalent to an industry-standard network switch, such as, for example, a Cisco switch or router. But for certain applications discussed throughout this document, it offers a better price/performance ratio as well as a power/performance ratio. It contains a layer 2 packet switch, with routing based on source/destination MAC addresses. It further supports virtual local area network (VLAN), with configurable VLAN filtering on domain incoming packets to minimize unnecessary traffic in a domain. The embedded MACs within the SOC do have complete VLAN support providing VLAN capability to the overall SOC without the embedded switch explicitly having VLAN support. It can also wake up the system by management processor notifying the management processor on link state transitions to reprogram routing configurations to route around faults. Such functionality does not require layer 3 (or above) processing (i.e., it is not a router). It also does not offer complete VLAN support, support for QoS/CoS, address learning, filtering, spanning tree protocol (STP), etc.

Figure 4:
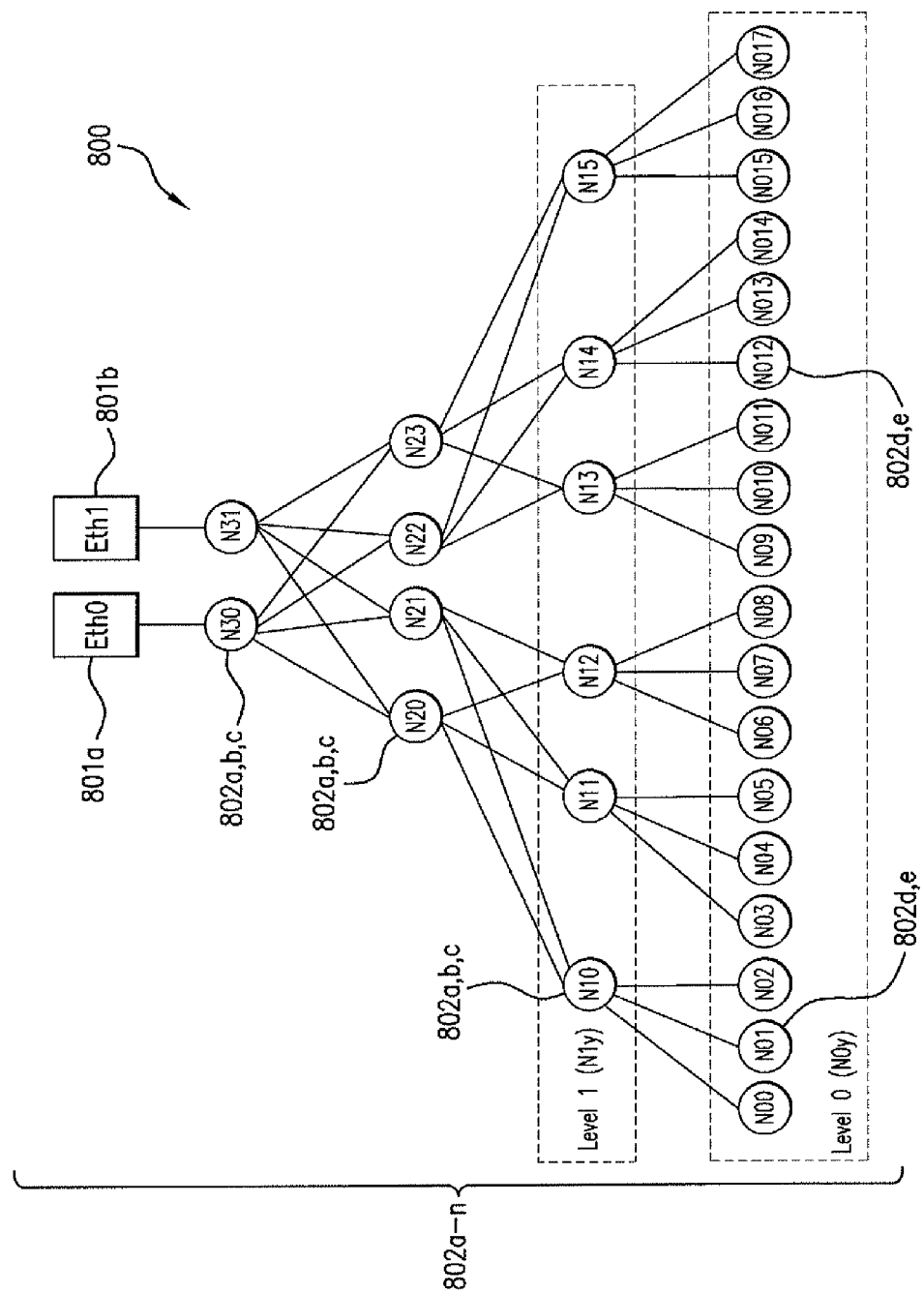
FIG. 4 illustrates a high-level topology of a network aggregating system.

FIG. 4 shows a high-level topology 800 of the network system that illustrates XAUI connected SoC nodes connected by the switching fabric. The 10 Gb Ethernet ports Eth0 801a and Eth1 801b come from the top of the tree. Ovals 802a-n are Smooth-Stone nodes that comprise both computational processors as well as the embedded switch. The nodes have five XAUI links connected to the internal switch. The switching layers use all five XAUI links for switching. Level 0 leaf nodes 802d, e (i.e., N0n nodes, or Nxy, where x=level and y=item number) only use one XAUI link to attach to the interconnect, leaving four high-speed ports that can be used as XAUI, 10 Gb Ethernet, PCIe, SATA, etc., for attachment to I/O. The vast majority of trees and fat trees have active nodes only as leaf nodes, and the other nodes are pure switching nodes. This approach makes routing much more straightforward. Topology 800 has the flexibility to permit every node to be a combination computational and switch node, or just a switch node. Most tree-type implementations have I/O on the leaf nodes, but topology 800 let the I/O be on any node. In general, placing the Ethernet at the top of the tree minimizes the average number of hops to the Ethernet.

Figure 5A:
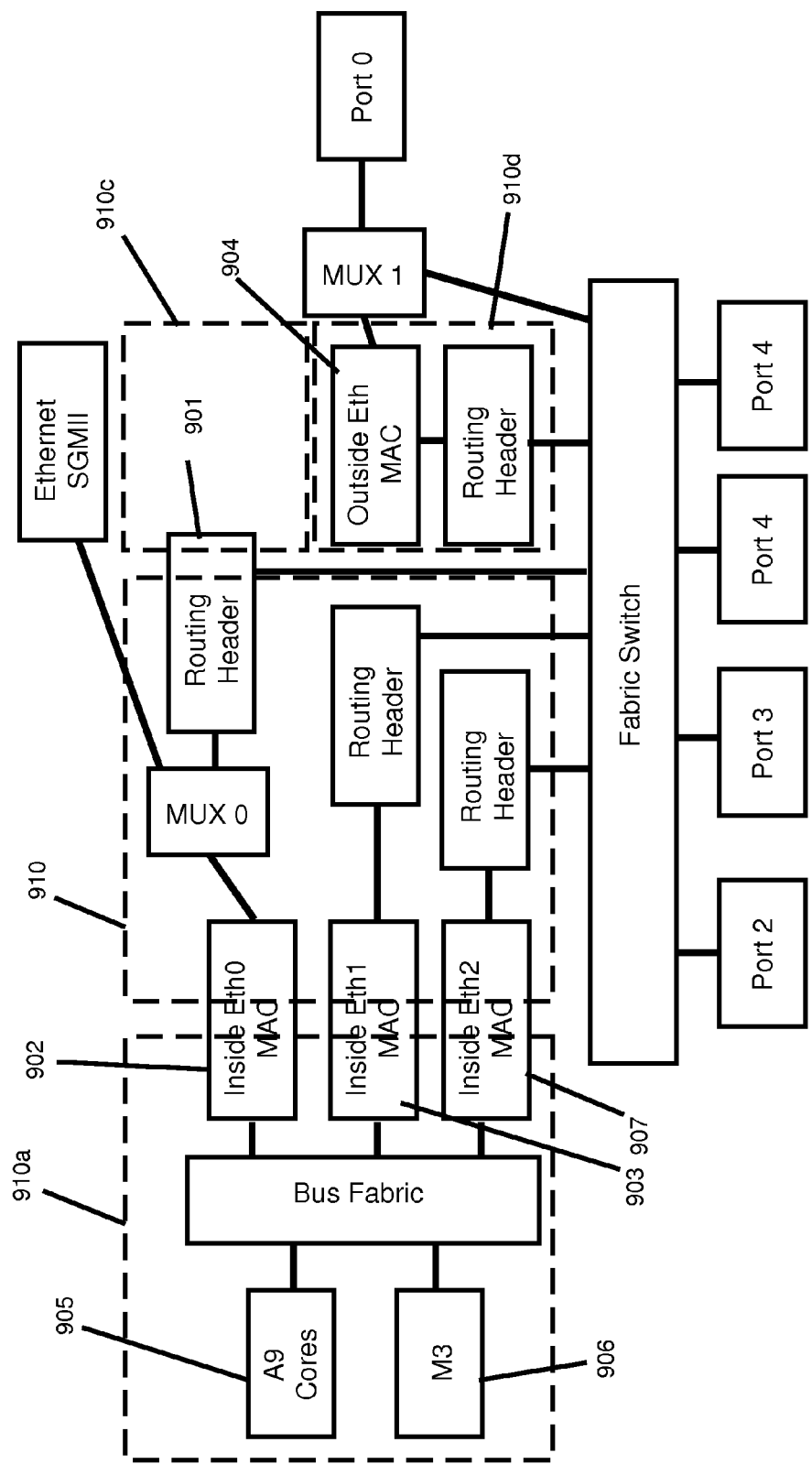
FIG. 5A illustrates a block diagram of an exemplary switch of the network aggregation system.
Figure 6:
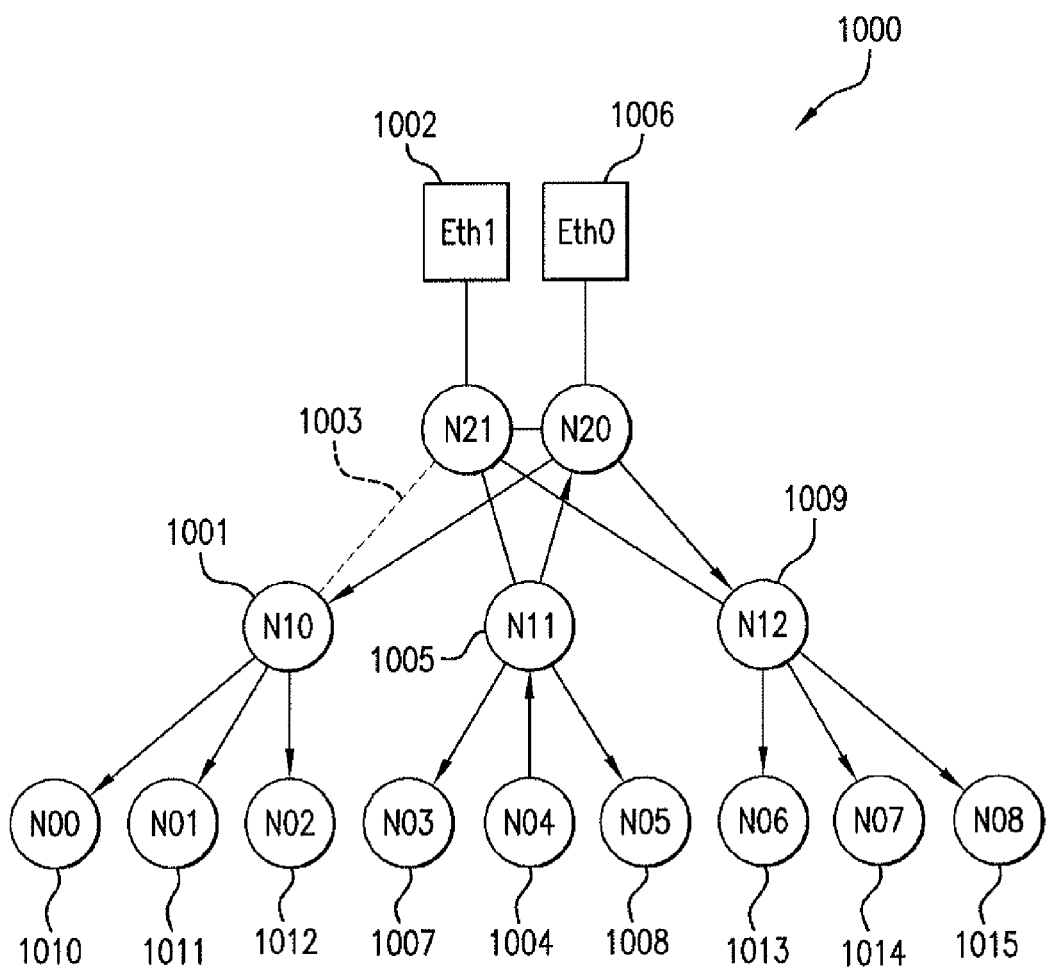
FIG. 6 illustrates a first embodiment of a broadcast mechanism of the network aggregation system.

In more detail, the ovals shown in the tree-oriented topology in FIG. 6 represent independent nodes within a computing cluster. FIG. 5A illustrates one example implementation of an individual node of the cluster. When looking at a conventional implementation of a topology e.g. in FIG. 6, usually computing nodes are found in the lower level leaf nodes (e.g. N00-N08), and the upper level nodes don't have computing elements but are just network switching elements (N10-N21). With the node architecture shown in FIG. 5A, the A9 Cores (905) may be optionally enabled, or could be just left powered-off. So the upper level switching nodes (N10-N21) in FIG. 6 can be used as pure switching elements (like traditional implementations), or we can power on the A9 Cores module and use them as complete nodes within the computing cluster.

The switch architecture calls for a routing frame to be prepended to the Ethernet frame. The switch operates only against fields within the routing frame, and does not inspect the Ethernet frame directly. FIG. 5a shows a block diagram of an exemplary switch 900 according to one aspect of the system and method disclosed herein. It has four areas of interest 910a-d. Area 910a corresponds to Ethernet packets between the CPUs and the inside MACs. Area 910b corresponds to Ethernet frames at the Ethernet physical interface at the inside MACs, that contains the preamble, start of frame, and inter-frame gap fields. Area 910c corresponds to Ethernet frames at the Ethernet physical interface at the outside MAC, that contains the preamble, start of frame, and inter-frame gap fields. . Area 910d corresponds to Ethernet packets between the processor of routing header 901 and outside MAC 904. This segmented MAC architecture is asymmetric. The inside MACs have the Ethernet physical signaling interface into the routing header processor, and the outside MAC has an Ethernet packet interface into the routing header processor. Thus the MAC IP is re-purposed for inside MACs and outside MACs, and what would normally be the physical signaling for the MAC to feed into the switch is leveraged. MAC configuration is such that the operating system device drivers of A9 cores 905 manage and control inside Eth0 MAC 902 (i.e., MAC0 in Table 2) and inside ETH1 MAC 903 (i.e., MAC1 in Table 2). The device driver of management processor 906 manages and controls Inside Eth2 MAC 907 (i.e., MAC management processor in Table 2). Outside Eth MAC 904 (i.e., MAC3 in Table 2) is not controlled by a device driver. MAC 904 is configured in Promiscuous mode to pass all frames without any filtering for network monitoring. Initialization of this MAC is coordinated between the hardware instantiation of the MAC and any other necessary management processor initialization. Outside Eth MAC 904 registers are visible to both A9 905 and management processor 906 address maps. Interrupts for Outside Eth MAC 904 are routable to either the A9 or management processor. A 10-GB Ethernet MAC supports several interruptible events that the CPUs may want to monitor, including any change in XGMII link fault status, hot-plugging or removal of PHY, alive status or link status change, and any RMON counter reaching a value equal to the threshold register.

In some cases, there may be Preamble, Start of Frame, and Inter-Frame gap fields across XAUI, depending on the specific micro-architecture. The routing frame header processor may standardize these fields. The XAUI interface may need some or all of these fields. In this case, the routing header processor at area 910d needs to add these going into the switch, and to remove them leaving the switch. To reduce the number of bytes that need to be sent over XAUI, these three fields may be removed (if the XAUI interface allows it). In this case, the routing header processor at area 910b will need to strip these going into the switch, and add them back leaving the switch.

The routing frame header processor receives an Ethernet frame from a MAC, sending a routing frame to the switch. It also standardizes the preamble, start of frame, and inter-frame gap fields, prepends a routing header, and receives a routing frame from the switch, sending the Ethernet frame into a MAC. This processor then strips the routing header and standardizes the preamble, start of frame, and inter-frame gap fields. Note that all frames that are flowing within the fabric are routing frames, not Ethernet frames. The Ethernet frame/routing frame conversion is done only as the packet is entering or leaving the fabric via a MAC. Note also that the routing logic within the switch may change fields within the routing frame. The Ethernet frame is never modified (except the adding/removing of the preamble, start of frame, and inter-frame gap fields).

The routing frame is composed of the routing frame header plus the core part of the Ethernet frame, and is structured as shown in Table 1, below:

TABLE 1

| Routing Frame Header | Ethernet Frame Packet | | | | |
|---|---|---|---|---|---|
| RF Header | MAC destination | MAC Source | Ethertype/ Length | Payload (data and padding) | CRC32 |

Note that the implementation assumptions for bit sizing are 4096 nodes→12 bit node IDs. These fields may be resized during implementation as needed.

The routing frame header consists of the fields shown in Table 2, below:

TABLE 2

| Field | Width (Bits) | Notes |
|---|---|---|
| Domain ID | 5 | Domain ID associated with this packet. 0 indicates that no domain has been specified. |
| Mgmt Domain | 1 | Specifies that the packet is allowed on the private management domain. |
| Source Node | 12 | Source node ID |
| Source Port | 2 | 0 = MAC0, 1 = MAC1, 2 = MAC_management processor, 3 = MAC_OUT |
| Dest Node | 12 | Destination node ID |
| Dest Port | 2 | 0 = MAC0, 1 = MAC1, 2 = MAC_management processor, 3 = MAC_OUT |
| RF Type | 2 | Routing Frame Type (0 = Unicast, 1 = Multicast, 2 = Neighbor Multicast, 3 = Link Directed) |
| TTL | 6 | Time to Live—# of hops that this frame has existed. Switch will drop packet if the TTL threshold is exceeded (and notify management processor of exception). |
| Broadcast ID | 5 | Broadcast ID for this source node for this broadcast packet. |
| Checksum | | Checksum of the frame header fields. |
| Total | 46 | +checksum |

If a switch receives a packet that fails the checksum, the packet is dropped, a statistic counter is incremented, and the management processor is notified.

Figure 5B:
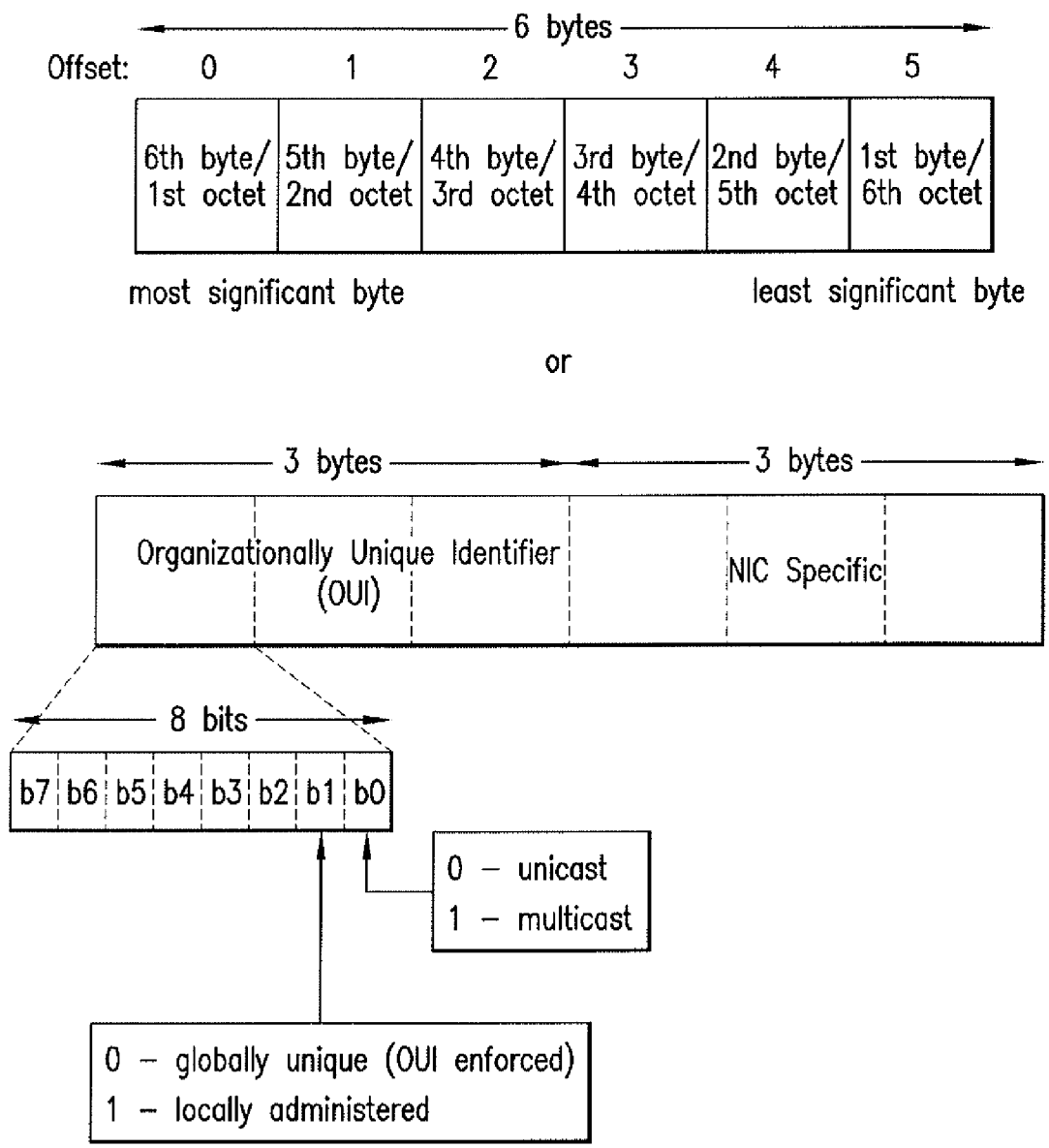
FIG. 5B illustrates the MAC address encoding.

The routing frame processor differentiates between several destination MAC address encodings. As a reminder, MAC addresses are formatted as shown in FIG. 5b. The following table describes the usage of the 3 byte OUI and 3 byte NIC specific field within the MAC address. One of the novel aspects of the system and method disclosed herein is the use of additional address bits to encode an internal to external MAC mapping, as shown also in the Table 3, below, in the second entry under "Fabric Internal Node local address Hits MAC Lookup CAM".

TABLE 3

| MAC Address Type | 3 bytes OUI | 3 bytes NIC Specific | Operation |
|---|---|---|---|
| External Misses MAC Lookup CAM | Multicast bit not set | Arbitrary | Packet unicast routed to gateway node #. |
| Fabric Internal Node local address Hits MAC Lookup CAM | Arbitrary | Node local address (meaning low 2 bits—port unit ID) are not present. MAC Lookup CAM for entry marked as Node Local. | Packet unicast routed to fabric node # obtained from MAC Lookup CAM |
| Fabric Internal Arbitrary MAC address Hits MAC Lookup CAM | Arbitrary | Arbitrary | Packet unicast routed to fabric node # obtained from MAC Lookup CAM |
| Node Encoded Unicast | Unicast Locally administered OUI == Switch OUI | 10 bits: SS_MAC_NODE_ENCODED_MAGIC 12 bits: Node ID 2 bits: Port ID | Packet unicast routed to Node ID. |
| Link Encoded Unicast | Unicast Locally administered OUI == Switch OUI | 12 bits: SS_MAC_LINK_ENCODED_MAGIC 7 bits: Reserved 3 bits: Link # (0-4) 2 bits: Port | Packet sent down specific Link #. |
| Multicast/ Broadcast | Multicast bit set | Arbitrary | Packet broadcast |

TABLE 3-continued

| MAC Address Type | 3 bytes OUI | 3 bytes NIC Specific | Operation |
|---|---|---|---|
| | | | routed through fabric and gateways. |
| Neighbor Multicast | Multicast bit set Locally administered OUI = Switch OUI | 12 bits: SS_NEIGHBOR_MCAST_MAGIC 12 bits: Reserved | Packet sent through all XAUI links to neighboring nodes and not rebroadcast to other nodes |

Further, other novel aspects can be found in Table 3 under "Node Encoded Unicast" as well as "Link Encoded Unicast," allowing one internal node or link to address all external MAC sections, and the "Neighbor Multicast" entry, allowing a multicast to neighboring nodes.

Note that the values SS_MAC_NODE_ENCODED_MAGIC and SS_MAC_LINK_ENCODED_MAGIC are constant identifiers used for uniquely identifying these MAC address types. The term "magic number" is a standard industry term for a constant numerical or text value used to identify a file format or protocol. These magic numbers are configured in two registers (magicNodeEncodedMAC and magicLinkEncodedMAC that default to standard values during hardware initialization, but allow the management processor software to change them if necessary.

The header processor contains a MAC Lookup CAM (Content Addressable Memory), macAddrLookup, that maps from 6 byte MAC addresses to 12-bit Node IDs, as shown in Table 4, below.

TABLE 4

| MAC Lookup CAM Input | | MAC Lookup CAM Output | |
|---|---|---|---|
| Node Local | MAC Address | Node ID | Port ID |
| 1 bit | 6 bytes | 12 bits | 2 bits |

The number of rows in this CAM is implementation dependent, but would be expected to be on the order of 256-1024 rows. The management processor initializes the CAM with Node ID mappings for all the nodes within the SS fabric. There are two types of rows, depending upon the setting of the Node Local bit for the row. The Node Local field allows a 4:1 compression of MAC addresses in the CAM for default MAC addresses, mapping all four MACs into a single row in the CAM table, which is Table 5, below.

TABLE 5

| MAC Address Type | Node Local | MAC Address | Port ID |
|---|---|---|---|
| Node Local | 1 | A Node Encoded Address refers to a Smooth Stone assigned MAC address for a node. It encodes the port # (MAC0, MAC1, management processor, Rsvd) into a 2-bit Port ID in the lowest two bits of the NIC address field. Ignores low 2 bits during match. | Taken from low 2 bits of MAC Address Input |
| Arbitrary | 0 | Matches against all 6 bytes | Taken from CAM Output field |

The arbitrary rows in the CAM allow mapping of the MAC address aliases to the nodes. Linux (and the MACs) allow the MAC addresses to be reassigned on a network interface (e.g., with ifconfig eth0 hw ether 00:80:48:BA:d1:30). This is sometime used by virtualization/cloud computing to avoid needing to re-ARP after starting a session.

The switch architecture provides for a secondary MAC Lookup CAM that only stores the 3 bytes of the NIC Specific part of the MAC address for those addresses that match the Switch OUT. The availability of this local OUT CAM is determined by the implementation. See Table 6, below.

TABLE 6

| MAC Lookup CAM Input | MAC Lookup CAM Output | |
|---|---|---|
| MAC Address NIC Specific | Node ID | Port ID |
| 3 bytes | 12 bits | 2 bits |

The maximum number of nodes limitation for three types of MAC address encodings may be evaluated as follows:

1. Default MAC Addressees—management processor sets Node Local mappings for each of the nodes in the fabric. There is one entry in the CAM for each node. Max # of nodes is controlled by maximum # of rows in the MAC Address Lookup CAM.

2. Node Encoded Addresses—All the MACs are reprogrammed to use Node Encoded Addresses. In this way the Node IDs are directly encoded into the MAC addresses. No entries in the MAC Lookup CAM are used. Max # of nodes is controlled by maximum # of rows in the Unicast lookup table (easier to make big compared to the Lookup CAM). Note that this also gives us some risk mitigation in case the MAC Lookup CAM logic is busted. Provides use case for the node encoded addresses idea.

3. Arbitrary MAC Address Aliases—Takes a row in the CAM. As an example, a 512-row CAM could hold 256 nodes (Node local addresses)+1 MAC address alias per node.

Since the Lookup CAM is only accessed during Routing Header creation, the management processor actually only needs to populate a row if the MAC address within the fabric is being used as a source or destination MAC address within a packet. In other words, if two nodes never will talk to each other, a mapping row does not need to be created. But usually the management processor won't have that knowledge, so it's expected that mappings for all nodes are created in all nodes. Also note that even if an entry is not created in the Lookup CAM, the routing will actually still succeed by routing the packet out the Ethernet gateway, through an external router, back into the Fabric, to the destination node.

Table 7 defines how to set fields within the Routing Header for all the fields except for destination node and port.

TABLE 7

| Field | Set To |
|---|---|
| Domain ID | Set to the macDomainID field for the MAC that the packet came from. |
| Mgmt Domain | Set to the macMgmtDomain field for the MAC that the packet came from. |
| Source Node | Switch Node ID |
| Source Port | Source MAC Port ID |
| RF Type | Multicast (if dstMAC multicast and not Neighbor Multicast format) Neighbor Multicast (if dstMAC multicast and is Neighbor Multicast format) Link Directed (is Link Encoded format) Unicast (if not one of the above) |
| TTL | 0 |
| Broadcast ID | If dstMAC is unicast - Set to 0 If dstMAC is multicast - Set to incremented local broadcast ID (bcastIDNext++ & 0xf) |

Table 8 defines how to set destination node and port for addresses within the fabric:

TABLE 8

| Case | Field: Destination Node | Field: Destination Port |
|---|---|---|
| Node Encoded Dest Address | Dest Node | Dest Port |
| Link Encoded Dest Address | Encoded Link | Dest Port |
| Hits Lookup CAM (node local) | CAM Dest Node | Dest MAC (low 2 bits) |
| Hits Lookup CAM (not node local) | CAM Dest Node | CAM Dest Port |

Table 9 defines how to set destination node and port for addresses outside the fabric:

TABLE 9

| Case | Field: Destination Node | Field: Destination Port |
|---|---|---|
| Came in an OUT Ethernet, but no secondary gateway defined | Drop packet, update statistics counter | |
| Came in an OUT Ethernet, and secondary gateway defined | secondaryEthGatewayNode[OUT] | OUT |
| From an Inside MAC, but no primary gateway defined | Drop packet, update statistics counter, and notify management processor | |
| From an Inside MAC, and primary gateway defined | primaryEthGatewayNode[fromPort] | OUT |

Additionally, the management processor software architecture of the system and method disclosed here currently depends on the ability of management processor nodes to "trust" each other. This more rigorous security on management processor to management processor communication is desirable, as well a better security on private management LANs across the fabric. This fabric issue may be mitigated by simply defining, for environments that require multiple "hard" security domains, that customers simply don't mix security domains within a fabric. In such cases, it may be possible to connect 14-node boards to the top of rack switch, allowing customers to have VLAN granularity control of each 14-node board.

The multi-domain fabric architecture that has been described addresses the lack of VLAN support by creating secure "tunnels" and domains across the fabric, and it can interoperate with VLAN protected router ports on a 1:1 basis.

The approach to domain management in the system and method disclosed here is as follows: Support multiple domain IDs within the fabric. Allow each of the MACs within a node (management processor, MAC0, MAC1, Gateway) to be assigned to a domain ID individually (and tagged with domain 0 if not set). Allow each of the MACs within a node to have a bit indicating access to the management domain. The domain IDs associated with a MAC could only be assigned by the management processor, and could not be altered by the A9. For frames generated by MACs (both inside and outside), the routing frame processor would tag the routing frame with the domain ID and management domain state associated with that MAC. Domains would provide the effect of tunnels or VLANs, in that they keep packets (both unicast and multicast) within that domain, allowing MACs outside that domain to be able to neither sniff or spoof those packets. Additionally, this approach would employ a five-bit domain ID. It would add options to control domain processing, such as, for example, a switch with a boolean per MAC that defines whether packets are delivered with non-defined (i.e., zero) domain ID, or a switch that has a boolean per MAC that defines whether packets are delivered with defined (non-zero) but non-matching domain IDs. A further option in the switch could turn off node encoded MAC addresses per MAC (eliminating another style of potential attack vector).

To keep management processor to management processor communication secure, the management domain bit on all management processor MACs could be marked. Generally, the management processor should route on domain 1 (by convention). Such a technique allows all the management processor's to tunnel packets on the management domain so that they cannot be inspected or spoofed by any other devices (inside or outside the fabric), on other VLANs or domains. Further, to provide a secure management LAN, a gateway MAC that has the management domain bit set could be assigned, keeping management packets private to the management processor domain. Additionally, the switch fabric could support "multi-tenant" within itself, by associating each gateway MAC with a separate domain. For example, each gateway MAC could connect to an individual port on an outside router, allowing that port to be optionally associated with a VLAN. As the packets come into the gateway, they are tagged with the domain ID, keeping that traffic private to the MACs associated with that domain across the fabric.

The switch supports a number of registers (aka CSRs, aka MMRs) to allow software or firmware to control the switch. The actual layout of these registers will be defined by the implementation. The fields listed in Table 10 are software read/write. All these registers need to have a mechanism to secure them from writing from the A9 (could be secure mode or on a management processor private bus).

TABLE 10

| Field | Size | Notes |
| --- | --- | --- |
| Adaptive | 1 bit | Adaptive unicast routing enabled. |
| broadcastLateral | 1 bit | Enable to have broadcasts go through lateral links, rather than just Up and Down links. Turning this off will work for most topologies and will reduce # duplicate broadcast packets. |
| intPortBroadcastVec | 4 bits | Vector of ports to send internally generated broadcast packet into. |
| extPortBroadcastVec | 4 bits | Vector of ports to send externally generated broadcast packet into. |
| linkDir[LINKS] | Array [LINKS] x 2 bits | Specifies link direction for each link (0 = DOWN, 1 = LATERAL, 2 = UP, 3 = Rsvd) |
| linkState | 5 bits | Link state vector for each of the 5 links. Bit set indicates that link is active (trained and linked). |
| linkType[LINKS] | Array [LINKS] x 2 bits | Specifies type of each link (0 = No Link, 1 = XAUI, 2 = Ethernet} |
| localBroadcastM3Snoop | 1 bit | When set, then we'll always send a copy of the locally initiated broadcast into the management processor. The use case here is where the management processor wants to see the gratuitous ARPs that are locally initiated so that it can communicate across the management processor fabric and add corresponding entries into the local unicast routing tables. |
| macAddrLookup | Lookup CAM which is described elsewhere in the document | MAC address lookup CAM to convert MAC addresses to Node IDs. |
| macAcceptOtherDomain[MAC] | 1 bit[MAC] | Defines that the MAC accepts packets that are tagged with a non-zero, non-matching domain ID. |
| macAcceptZeroDomain[MAC] | 1 bit[MAC] | Defines that the MAC accepts packets that are not tagged with a domain (i.e. 0 domain) |
| macDomainID[MAC] | 5 bits[MAC] | Defines the Domain ID for each of the 4 MACs. A value of 0 indicates that the domain ID for that MAC is not set. |
| macMgmtDomain[MAC] | 1 bit[MAC] | Defines that the MAC may access the management domain. Setting this tags the management domain in the routing frame, as well as allows the switch to route management frame packets into this MAC. |
| magicNodeEncodedMAC | 10 bits | Magic number for Node Encoded MAC addresses |
| magicLinkEncodedMAC | 12 bits | Magic number for Link Encoded MAC addresses |
| maxTTL | 6 bits | Maximum TTL count allowed in a routing header. Exceeding this number of hops causes the switch to drop the packet, update a statistic counter, and inform the management processor. |
| myNodeID | 12 bits | Need not be contiguous. Subtree's should ideally be numbered within a range to facilitate subtree network proxying. |
| myOUI | 3 bytes | 3 upper bytes of MAC addresses in fabric. Should be the same for all nodes in the fabric. |
| nodeRangeEnable | 1 bit | Enables the expanded Node ID matching of [nodeRangeLo, nodeRangeHi]. Used for Network Proxying through a subtree. When enabled, a packet will be routed into the node (rather than through the node) if either DstNode == myNodeID OR (nodeRangeLo <= DstNode <= nodeRangeHi). |
| nodeRangeHi | 12 bits | Enabled with nodeRangeEnable. Specifies high node ID of node range match. |
| nodeRangeLo | 12 bits | Enabled with nodeRangeEnable. Specifies low node ID of node range match. |

TABLE 10-continued

| Field | Size | Notes |
|---|---|---|
| noFlowControl | 1 bit | When enabled, there will be no flow control. |
| portRemap[INT_PORTS]; | Array [INT_PORTS] x 2 bits | Allows remapping of incoming destination port IDs to the internal port where it'll be delivered. This register defaults to an equivalence remapping. An example of where this will get remapped is during Network Proxy where the management processor will remap MAC0 packets to be sent to the management processor. INT_PORTS = 4. Array elements are the Ports enumeration (management processor, MAC0, MAC1, OUT). 2 bits contents is the Ports enumeration. |
| primaryEthGatewayNode[INT_PORTS] | Array [INT_PORTS] of 12-bit | Specifies Node ID of primary Ethernet gateway for this node. Packets destined to node IDs that aren't within the fabric will get routed here. |
| promiscuousPortVec | 4 bits | Can be configured for Promiscuous Mode allowing traffic on one or more links to be snooped by the management processor or A9s in order to collect trace data or to implement an Intruder Detection System (IDS). This causes all traffic passing through the switch to be copied to the internal ports defined by this port vector. |
| routeForeignMACsOut | 1 bit | When enabled, a MAC address that does not contain a myOUI address, will not check the MAC lookup CAM, and will get treated as a MAC lookup CAM miss, thus getting routed to the gateway port. This saves latency in the common case of not populating the CAM with foreign MAC aliases. |
| secondaryEthGatewayNode[INT_PORTS] | Array [INT_PORTS] of 12-bit | Specifies Node ID of secondary Ethernet gateway. Incoming (from OUT) packets routing through the fabric will be sent here. |
| unicastPortsFromOtherExt Gateways | 1 bit | An incoming unicast from an external gateway will get the gateway node put into the source node field of the routing header. Upon reaching the destination node, this bit will be checked. When the bit is clear, the external gateway node must match the destination gateway node for it to be delivered to internal ports. This is to handle the case where the fabric is connected to an external learning switch that hasn't yet learned the mac/port relationship, and floods the unicast packet down multiple ports. This will prevent a fabric node from getting the unicast packet multiple times. |
| unicastRoute[NODES] | Array [NODES] of 10 bits | Link vector of unicast next route. 10 bits is 2-bit weight for each of 5 links. |

The registers shown in Table 11 are contained within the Switch implementation, but need not be software accessible.

TABLE 11

| Field | Size | Notes |
|---|---|---|
| bcastIDNext | 5 bits | Next broadcast sequence ID to issue next. Hardware will increment this for each broadcast packet initiated by this node. |
| bcastIDSeen[BCAST_ID_LEN] | Array [BCAST_ID_LEN] of 5 bits. | FIFO list of broadcast tags seen by this node. |
| bcastIDSeenNext | # bits to index into BCAST_ID_LEN | Next array position into bcastIDSeen[ ] to insert a broadcast tag. |

Note that software should be able to update the routing tables (unicastRoute) and the macAddrLookup CAM atomically with respect to active packet routing. One implementation will be to hold off routing access to these tables during an update operation.

Broadcast/Multicast Routing

Figure 7:
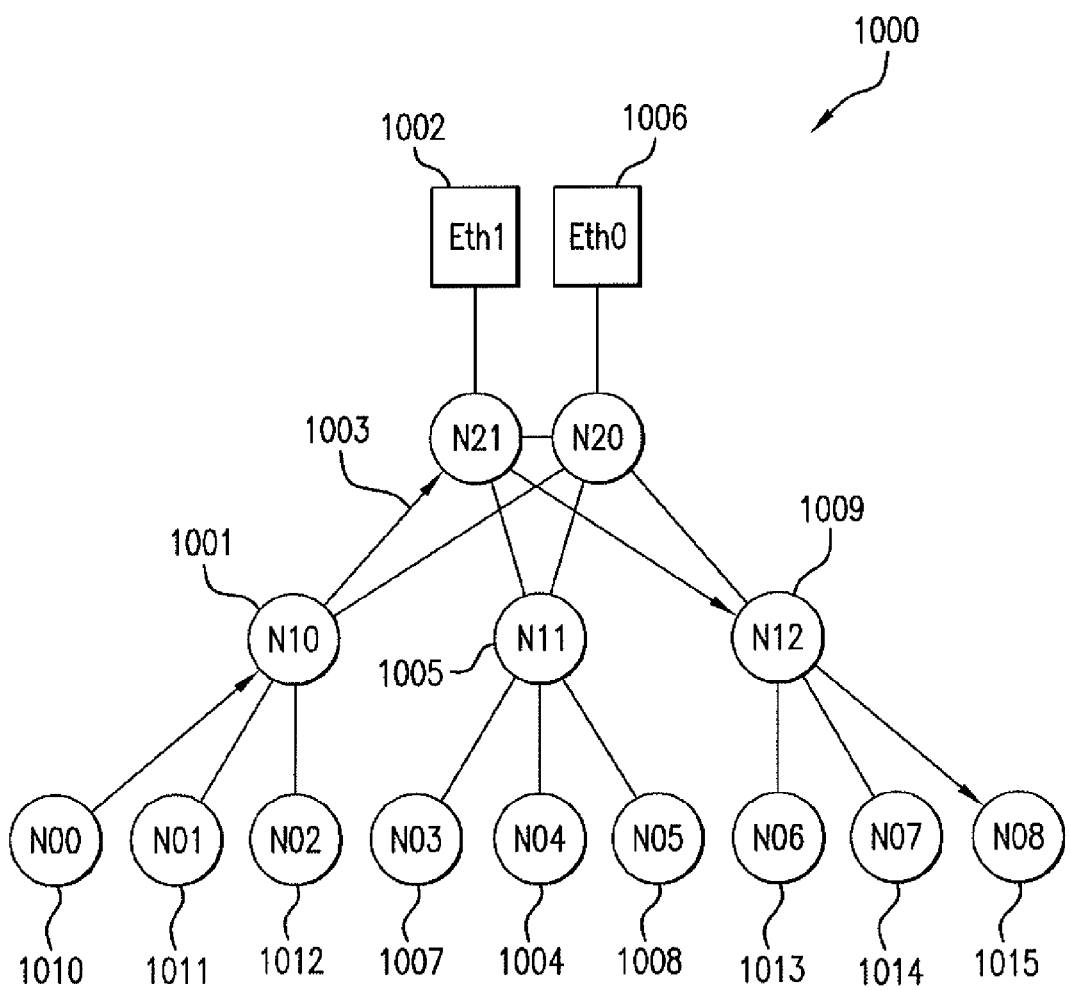
FIG. 7 illustrates an example of unicast routing of the network aggregation system.

FIG. 6 shows an exemplary broadcast mechanism 1000 according to one aspect of the system and method disclosed herein. The link between nodes N10 1001 and N21 1002 is down, as indicated by the dashed line 1003. During routing header generation of multicast packets, the source node puts an incremented broadcast ID for that source node in the routing frame (rframe.bcastID). When a node receives a multicast routing frame (i.e. rframe.rfType==Multicast||rframe.rfType==NeighborMulticast), it checks to see whether it has already seen this broadcast packet. The check is done by accessing the bcastIDSeen CAM with a tag formed with the broadcast source node and the broadcast ID. If it has already been seen (i.e. CAM hit), no action is be performed. If the broadcast frame has not been seen before, it broadcasts it to appropriate internal ports and external gateways (intPortBroadcastVec register) and rebroadcasts it through all outward XAUI links except for the link it came in on. Note that it only broadcasts through laterals if the broadcastLateral register is set. It is unnecessary to broadcast laterals on most topologies, and doing so may reduce the number of duplicated broadcast packets by disabling it. It then adds this broadcast tag to the bcastIDSeen CAM in FIFO order. In FIG. 7, N04 1004 initiates a broadcast to all neighbors, i.e., N11 1105. N11 has not seen the packet, so it broadcasts to all non-incoming neighbors, which, in this example, are N21 1002, N20 1006, N03 1007, and N05 1008, and accepts the packet internally. Nodes N03 and N05 haven't seen the packet, so they accept the broadcast internally and are done. N21 hasn't seen the packet, so it broadcasts the packet to all active, non-incoming links (e.g., N10, N12 1009), and accepts the packet internally. N20 broadcasts the packet to all active, non-incoming links (i.e., N12), and accepts the packet internally. N10 broadcasts down to N00 1010, N01 1011, and N02 1012. N12 rebroadcasts to N06 1013, N07 1014, N08 1015 and to one of N21 and N20 (the one it didn't get the broadcast packet from). Note that one of N20 and N21, and N12, see the packet twice. They take action only on their first instance, the secondary times it hits the broadcast CAM as a duplicate, and the packet is ignored.

Unicast Routing

Unicast to Other Node

Unicast routing (as shown in FIG. 7) is responsible for routing non-multicast (i.e. unicast) packets to the next node. This is done by utilizing a software computed unicastRoute[] next node routing table that provides a vector of available links to get to the destination node.
Condition
rframe.rfType==Unicast
Routing There are substantial complexities related to routing around faults. Fault free routing and routing around faults will be discussed separately.

Traditionally in tree routing, the packet will be routed upward until a common parent of (source, destination) is reached. This upward routing can be deterministic, oblivious, or adaptive. The packet is then routed downward to the destination using deterministic routing.

As an example, FIG. 7 illustrates a packet routing from node N00 1010 to N08 1015. The packet is routed in the upward phase to the common ancestor (N21) through node N10 1001, and then a descent phase to the destination.

Note that during the upward phase at node N10, there are two candidate links (N10,N21) and (N10,N20). The first candidate link could be chosen deterministically, or an adaptive algorithm could dynamically select either of the links. But, once the node reaches the common ancestor and turns downward, there are no redundant paths (in general) for the node to reach the destination.

Unicast Routing in the Presence of No Faults

Each link is annotated within this unicastRoute table with a 2-bit linkWeight where software can express the relative cost/distance to the destination node via this link. By convention, link weights should represent:
   0=No route
   3=Direct next-hop connection
   1 and 2=Software computed relative costs. As an example if there are routes across 3 links with costs of 2 hops, 3 hops, and 6 hops, the first two links could be assigned weight=2 and the 6 hops path could be assigned weight=1.

Algorithm for Fault-Free Unicast Routing:
   Get link weight vector from the unicast routing table
      linkWeightVector=unicastRoute[rframe.dstNode]
   Remove link that it came in on to remove possibility of sending it back
   Remove any links that are not up
   At this point, have a candidate list of links with associated link weights.
   Iterate through link weights, starting with highest priority (3) down through 1. Gather candidate list of links at this priority, stopping once the candidate list has at least one link. The result is a candidate list of links at the highest priority. As an example, if there are 2 links at weight=2, and 2 links at weight=1, the prioritized candidate list will contain the two links at weight=2.
   The adaptive register is checked to determine whether to do adaptive or deterministic routing.
      adaptive==0 indicates that deterministic routing is to be used, so the first link is chosen from the prioritized candidate list.
      adaptive==1 indicates that adaptive routing is to be used. The switch implementation will choose an algorithm for adaptively choosing the target link from the prioritized candidate list. This adaptive algorithm could be as simple as round-robin around the list. Alternatively, may choose to factor in other attributes e.g. FIFO free depth, link speed, . . .
      An implementation option could be to add a register option to allow the router to adaptively choose from all non-zero weights, or to only adaptively choose from the highest priority candidate lists.
   The packet is sent out the selected link.

Fault-Resilient Unicast Routing

A couple of issues contribute to the complexity of fault-resilient unicast routing:
   The desire to do fault routing with only localized knowledge. A node implicitly knows that a link is down to a neighbor node. We choose a design to avoid having to communicate that a link (or node) goes down elsewhere in the fabric due to the complexities of maintaining a global, unified state in the presence of failures.
   The nature of routing in a tree. During the ascent phase of packet routing, links can be adaptively chosen from redundant links so it can be straightforward to avoid a link with the normal adaptive link selection.

But, once the packet starts descending, traditionally there is not redundant paths for the descent path (that follow the routing rules), so fault routing can become challenging.

Figure 8:
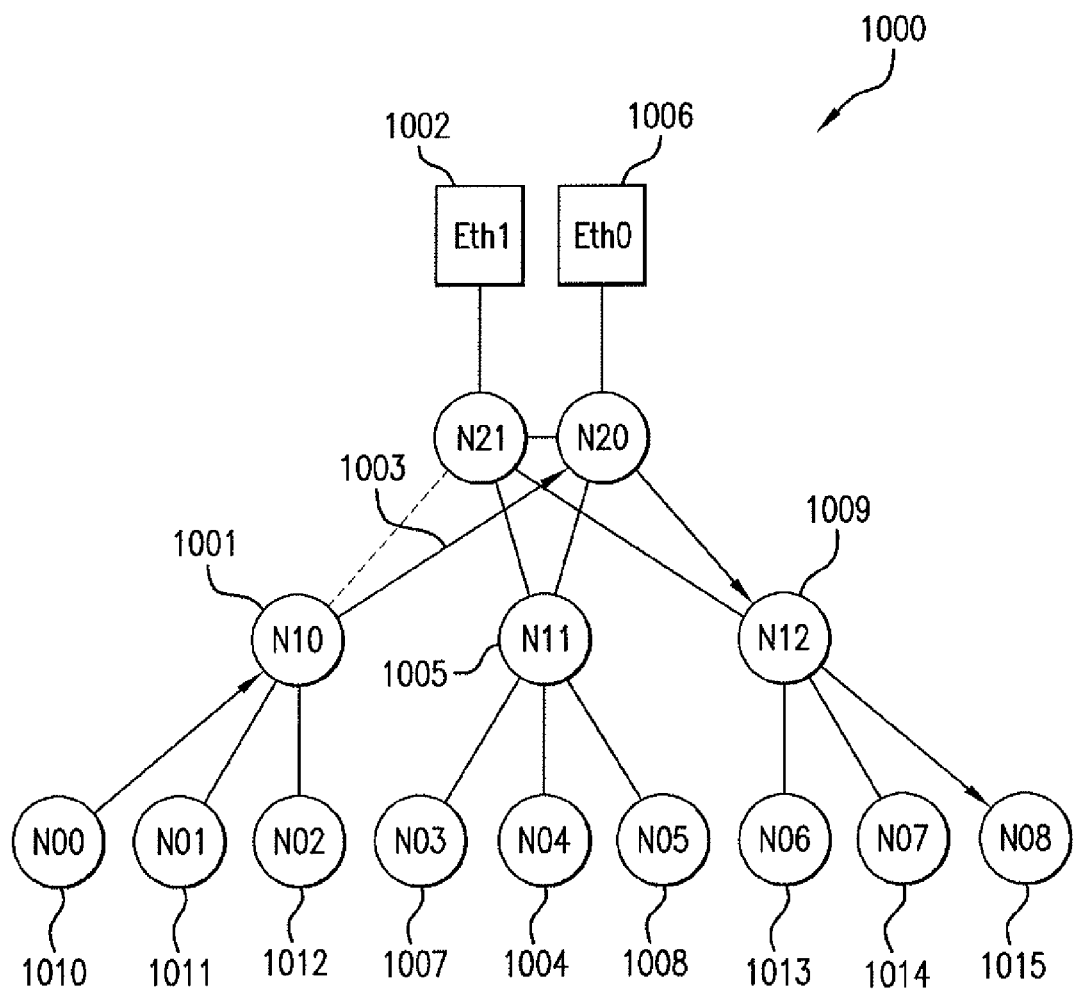
FIG. 8 illustrates an example of fault-resistant unicast routing of the network aggregation system.

FIG. 8 illustrates a link failure (N10,N21) and unicast routing selected the (N10, N20) link using the normal adaptive routing algorithm previously described. But note, if the packet is routed up to N20 and link (N20, N12) is down, it has no easy path to get to the destination.

We have two approaches to handling routing around failures:

Software can compose alternative but non-desirable routes with weight=1. We'll call these escape routes. These are low priority routes that may violate the strict routing rules used during routing around faults. As an example, if the link (N10, N21) was down, the unicastRoute[N08] entry for N20 could contain link to N12 with weight=2 and a link to N11 with weight=1. In this way, the normal adaptive routing algorithms will automatically do the N00->N10->N20->N12->N08 path.

The fabric architecture includes a technique that we refer to as "misrouting". Misrouting provides for iterative back-tracking.

Both of these techniques will provide substantial unicast fault-resilience.

Unicast Misrouting

Figure 9:
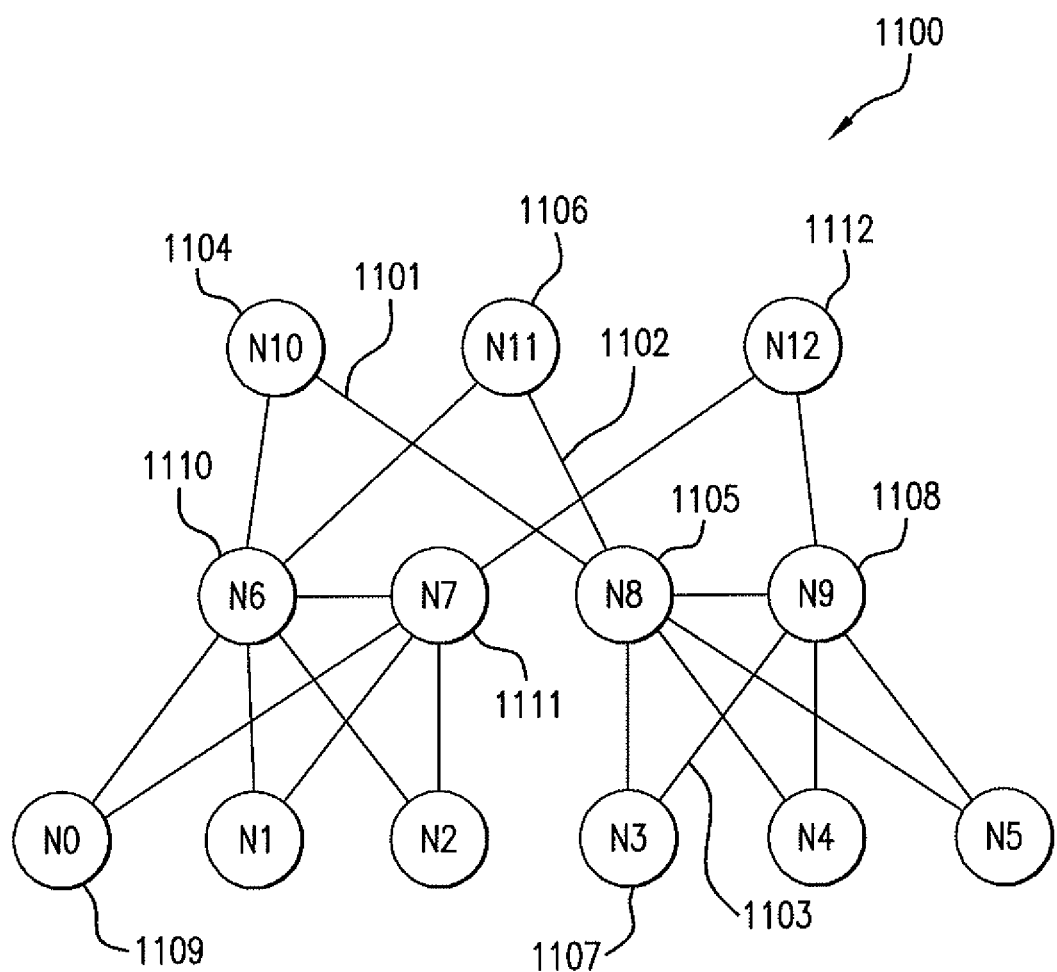
FIG. 9 illustrates a second embodiment of a broadcast mechanism of the network aggregation system.

As an example, consider the following topology, with 3 links 1101, 1102 and 1103 that have failed (shown in in FIG. 9). Consider a unicast route from N0 to N3. We'll consider the following routing to understand the misrouting technique, understanding that this is only one of several routes that could have been chosen adaptively.

Packet routed N0 to N6.

Packet routed N6 to N10

N10 sees that it has no paths to get to N3, other than the link it came in on. N10 sets the misrouting bit in the routing header, and sends it back to N6.

N6 sees that the packet is being misrouted, sets the bit for the N10 link in the misrouteVector in the routing header, chooses an alternative link that has not been misrouted, and sends the packet to N11.

N11 sees that it has no path to N3, other than the link it came in on. misrouting bit is already on, and sends it back to N6.

N6 sees that the packet is being misrouted, adds N11 link to the misrouteVector (now contains N10 and N11 link IDs), chooses an alternative link that has not been misrouted, and sends it N7.

N7 sees that the misrouting bit is set, but does have a valid link to N3 (to N12), and thus clears the misrouting bit in the header, and forwards the packet to N12.

N12 sends to N9.

N9 unicastRoute now likely contains link to N3 (weight=3) and link to N8 (weight=2). Normal adaptive routing will not choose the direct link to N3 since it's down, and will route the packet to N8, then finally to N3.

If N6 had exhausted its list of candidate links (meaning the misrouteVector masked them all), the implementation then has two choices:

drop the packet and inform the M3 of the failure to route.

clear the misrouteVector leaving misrouting set, and forward the packet through one of the downward facing links (if one exists). This will retry misrouting at one layer lower. The implementation may want to have a register bit (enableRecursiveMisrouting) to enable this retry at lower layer option.

There is a register enableMi smiting that allows software to control whether the switch will initiate the misrouting algorithm.

Multi-Domaining

Also known to the inventors is Multi-Domaining, whose goal is to increase the addressability of nodes to a large number of nodes (e.g., 64K nodes), without having to increase the size of the unicast routing table to 64K nodes.

As currently described, the unicast routing table is a single-dimension array indexed by node number (i.e. 0 to MAX_NODES-1), where a typical implementation will be between 256 and 4K nodes.

This section will now describe how the current architecture is altered to support multiple domains, with 64K max nodes.

The node namespace is changed from a node ID from 0 to MAX_NODES-1, to a 2-tuple of (domain ID, node ID), where both domain ID and node ID range from 0 to 255. So, there can effectively be 256 domains where each domain can contain up to 256 nodes.

The unicast routing table is changed from a single dimension table of size MAX_NODES, to a two-dimension table of size 256. The unicast routing table is now changed from a structure of unicastRoute[NODES] to unicastRoute[2][256].

Local domain routing: When routing to a node within this domain, the unicast routing table is accessed as unicastRoute[0][node ID], and provides a weighted link vector to route to the specified node ID from the current node.

Remote domain routing: When routing to a node within a remote domain, the unicast routing table is accessed as unicastRoute[1][domain ID], and provides a weighted link vector to route to the specified domain ID from the current node.

Routing frame: One bit is added to the routing frame, dstRemote, which is set true when routing to a remote domain.

Locally administered MAC addresses: The section below describes the Node Encoded Unicast MAC address encoding as follows:

| Node Encoded Unicast | Unicast Locally administered OUI == Switch OUI | 10 bits: SS_MAC_NODE_ENCODED_MAGIC 12 bits: Node ID 2 bits: Port ID |
|---|---|---|

This gets altered for multi-domaining as follows:

| Node Encoded Unicast | Unicast Locally administered OUI == Switch OUI | 6 bits: SS_MAC_NODE_ENCODED_MAGIC 8 bits: Domain ID 8 bits: Node ID 2 bits: Port ID |
|---|---|---|

Creating the routing frame header: Table 2 describes the algorithms for creating the routing frame header. This is augmented in the multi-domaining case by:

```
if ( dstDomain == myDomainID ) {            // Route to local domain
   rframe.dstRemote = false;
   rframe.dstNode = dstNode;
}
```

```
else {                    // Route to remote domain
    rframe.dstRemote = true;
    rframe.dstNode = dstDomain;
```

Network Proxy

The concept of network proxy is the ability of the main processors (FIG. 5A, 905) to maintain network presence while in a low-power sleep/hibernation state, and intelligently wake when further processing is required. There are several architectural features related to Network Proxy:

- There is a CSR (portRemap) to allow the remapping of Port IDs. In effect, when the switch is to deliver a packet to an internal MAC0 port (e.g. FIG. 5A, 902), this Port Remapping CSR allows software to remap MAC0 to the management processor MAC (e.g. FIG. 5A, 907) and have the packet delivered to the management processor for Network Proxy processing. This remapping CSR could also be used to remap MAC1 traffic to MAC0, or MAC1 traffic to the management processor.
- Normally, the switch looks at the destination node ID of the routing frame to decide whether the packet is delivered to an internal port within the node, or gets routed to other XAUI connected nodes. This is done by matching Destination Node ID to "My Node ID". The Node ID Match register (nodeRangeLo, nodeRangeHi) causes the packet to be delivered to an internal port within the node if nodeRangeLo<=Destination_Node<=nodeRangeHi||myNodeID==Destination_Node. This allows a node to proxy for a subtree of nodes.
- A typical use sequence would be of the form:
- Management processor maintains the IP to MAC address mappings for MAC0 and MAC1 on the node. This can be done via either explicit communication of these mappings from the main processor OS to the management processor, or can be done implicitly by having the management processor snoop local gratuitous ARP broadcasts.
- The main processor coordinates with the management processor to go to a low power dormant state. During this transition, the management processor sets up the Port ID remapping CSR to route MAC0 and MAC1 traffic to the management processor.
- The management processor processes any incoming MAC0/MAC1 packets. There are 3 categories of processing:
  - Respond to some classes of transactions that require simple responses (e.g. ARP responses and ICMP ping).
  - Dump and ignore some classes of packets, typically unicast or broadcast packets that are targeting other computers.
  - Decide that the main processor must be woken to process some classes of packets. The management processor will wake the main processor, undo the Port ID remapping register, and re-send the packets back through the switch where they will get rerouted back to MAC0/1, Wake-on-LAN Magic Packet In a traditional desktop computer, the computer to be woken is shut down (sleeping, hibernating, or soft off; i.e., ACPI state G1 or G2), with power reserved for the network card, but not disconnected from its power source. The network card listens for a specific packet containing its MAC address, called the magic packet, broadcast on the broadcast address for that particular subnet (or an entire LAN, though this requires special hardware or configuration). The magic packet is sent on the data link or layer 2 in the OSI model and broadcast to all NICs within the network of the broadcast address; the IP-address (layer 3 in the OSI model) is not used. When the listening computer receives this packet, the network card checks the packet for the correct information. If the magic packet is valid, the network card takes the computer out of hibernation or standby, or starts it up.

The magic packet is a broadcast frame containing anywhere within its payload: 6 bytes of ones (resulting in hexadecimal FF FF FF FF FF FF), followed by sixteen repetitions of the target computer's MAC address. Since the magic packet is only scanned for the string above, and not actually parsed by a full protocol stack, it may be sent as a broadcast packet of any network- and transport-layer protocol. It is typically sent as a UDP datagram to port 0, 7 or 9, or, in former times, as an IPX packet.

Using the Network Proxy architecture just described, the management processor can support these Wake-On-LAN packets. It will get these broadcast packets, will know the MAC addresses for the other MACs on the node, and be able to wake up the main processor as appropriate. No further functionality is needed in the switch to support these Wake-on-LAN packets.

Power Control Features

A system and method to manage the supply of power to large sets of processors or processor cores in an efficient, closed-loop manner are provided such that rather than the system supplying power that may or may not be used, a processor would request power based on the computing task at hand, which request would then be sent to the power supply system and thus power made available. Further needed is bidirectional communication between the CPU(s) and the power supply stating it has a certain limit, and rather than giving each processor its desired amount of power, said system may give a processor an allocation based on prorated tasks. Additionally needed is a method of prioritization that may be used to reallocate power among processors, so the allocation does not have to be a linear cut across the board.

Some of the leading processor architectures have a thermal management mode that can force the processor to a lower power state; however none at present time imposes similar power reduction dynamically based on the available power resources of the system, as they assume that sufficient power is always available.

Each processor typically can run in a number of power states, including low power states where no processing occurs and states where a variable amount of execution can occur (for example, by varying the maximum frequency of the core and often the voltage supplied to the device). This latter mechanism is commonly controlled by monitoring the loading of the node, and if the load is low, decreasing the maximum frequency/voltage of the CPU (the frequency and voltage of the core would be adjusted downward so as to not exceed the power limit set in order to keep the load below the capability limit of the power supply) until the amount of idle is reduced. The reverse is also often the case: if loading is high the frequency/voltage can be increased. Predictive mechanisms also exist where queued transactions are monitored, and if the queue is short or long the voltage and frequency can be altered appropriately. Finally, in some cases a computational load (specifically in the cloud nature of shared threads across multiple cores of multiple processors) is shared between several functionally identical processors. In this case it's possible to power down (or move into a lower power state) one or more of those servers if the loading is not heavy.

Currently there is no connection between power supply generation to the processors and the power states of each processor. Power supplies are provisioned so that each processor can run at maximum performance (or close to it) and the redundancy supplied is sufficient to maintain this level, even if one power supply has failed (in effect double the maximum expected supply is provided). In part, this is done because there is no way of limiting or influencing the power state of each processor based on the available supply.

A similar situation applies to cooling in an array of multiple processors, although due to the slow increase of temperature, it can be monitored and capacity can be turned on or off (e.g., increase or slow fans). Based on the currently used capacity, enough capacity must still be installed to cool the entire system with each system at peak performance (including any capacity that might be powered down through failure or maintenance).

In effect, the capacity allocated in both cases must be higher than absolutely necessary, based on the inability to modulate design when capacity limits are approached. This limitation also makes it difficult to install short-term peak clipping capacity that can be used to relieve sudden high load requirements (as there is no way of reducing the load of the system when it is approaching the limits of that peak store). As an example, batteries or any other means of storing an energy reserve could be included in the power supply system to provide extra power during peaks; however, when they approach exhaustion the load would need to be scaled down. In some cases, cooling temperatures could simply be allowed to rise for a short period.

Figure 10:
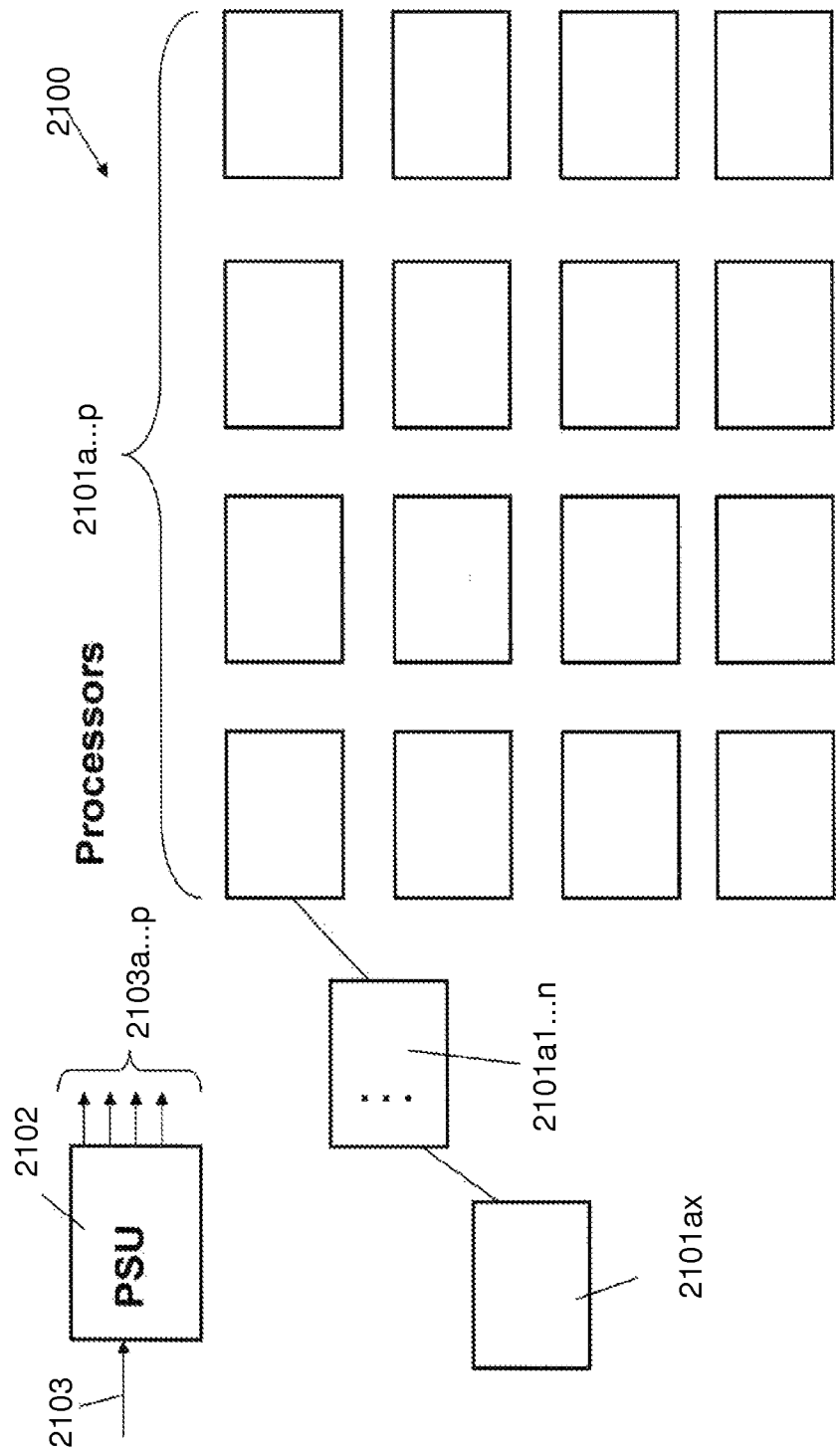
FIG. 10 illustrates an exemplary system for management of power supplied to multiple processors.

FIG. 10 shows an overview of an exemplary system 2100 for management of power supplied to multiple processors according to one embodiment of the current disclosure. An array of 16 processors 2101a-p is shown. Each processor has its own complete computing system, with memory and communication interconnection buses, a power feed, etc. All of these elements of each processor's system are well known in current art and are not shown here, for reasons of simplicity and clarity. Processor 2101a has an operating system with multiple programs 2101a1-n. One of these programs, 2101ax, is of particular interest. It is the piece that communicates with the system management software of the current disclosure, described in greater detail in the discussion of FIG. 12, below. The system management software can actually run on any one of the processors 2101a-p, or it can run on a separate, dedicated processor (not shown). A power supply unit (PSU) 2102 gets a main feed 2103 and distributes it through subfeeds 2103a-p to each of the processors 2101a-p according to their individual needs. In some cases more than one processor 2101b-p can have similar software 2101b1-n through 2101p1-n, including 2101bx-px.

Figure 11:
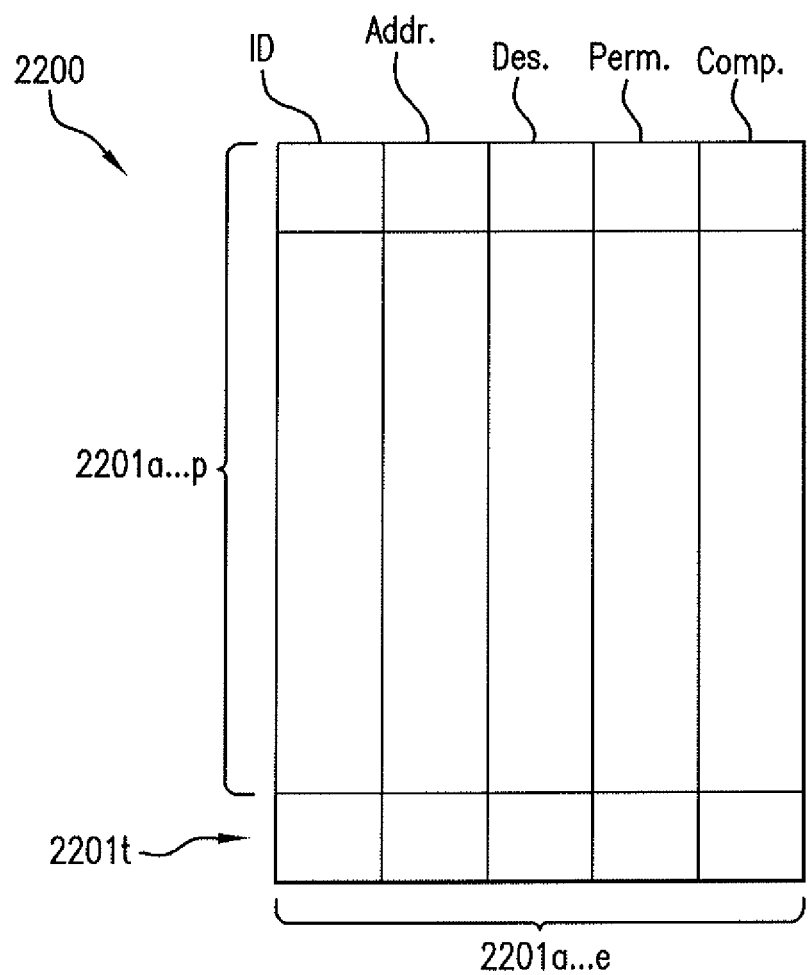
FIG. 11 illustrates an exemplary data structure that may be maintained by a power management system shown in FIG. 10.

FIG. 11 shows an exemplary table 2200 that could be maintained by a power management system such as management system 2100, for example, as described in FIG. 10. Each row 2201a-p contains records of parameters 2202a-e that are recorded in columns They may be updated from time to time as necessary, either if certain changes occur or on an interval basis, etc. It is clear that the five parameters 2202a-e are only exemplary of any of a great variety of parameters that may be included in table 2200, so the number of parameters is not restricted to five only. In this example, parameters are (reading left to right) CPU ID, actual current usage, desired usage based on tasks awaiting execution by the CPU, permitted usage allocated to the CPU at the moment, and the computational load waiting, for example, processes waiting in queue, with an additional priority rating in some cases (not shown). A record 2201t sums up the total of the parameter records of rows 2201a-p for array 2101a-p. Each processor in array 2101a-p may actually be a chip containing multiple CPUs or multiple cores of its own, so, in the case of array 2101a-p, the actual number of processors involved may be, for example, 256, instead of 16, if each chip were to contain 16 cores.

Figure 12:
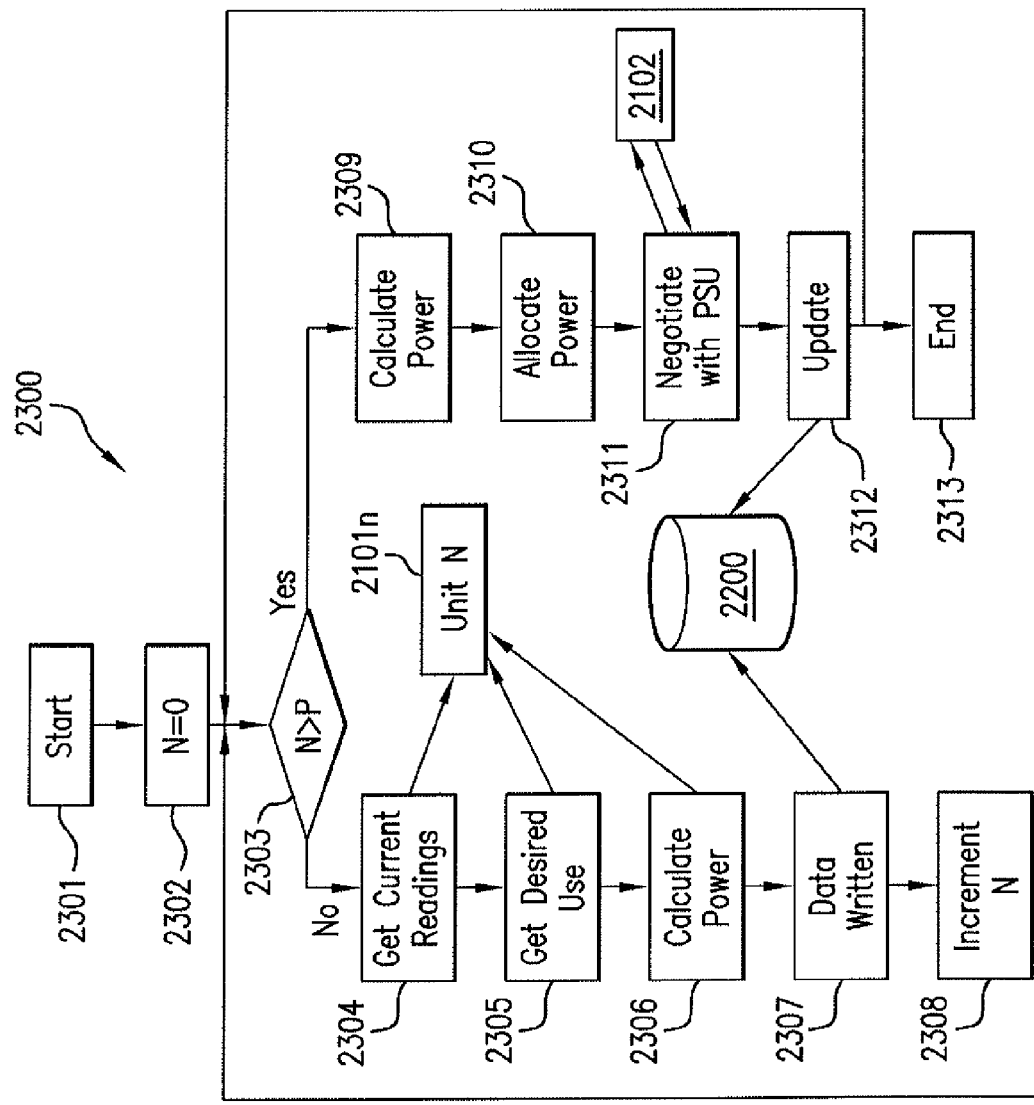
FIG. 12 an example of a process for power management.

FIG. 12 shows an exemplary process 2300 of the management software executed in any one of the processors of array 2101a-p or in a dedicated processor (not shown), according to one embodiment of the present disclosure. In step 2301 the system starts, and in step 2302 it starts a count of the number of process repetitions in one session. In step 2303 the system checks to see whether the count exceeds a pre-set maximum, which in this example is P, the number of units in array 2101a-p that must be addressed. It is clear that because P represents a number, there is no practical limitation to the numeric value of P. If the count does not exceed the set maximum (NO), in step 2304 the system receives current readings from unit N, which in this example is chip 2101n. Each chip, as noted previously, may contain multiple CPUs. In some implementations, power need is assessed on a per-chip basis, while in other implementations, power need is assessed for each separate CPU or core in a chip. In step 2305, the system obtains the desired power usage, based on computational requirements and priority between the requirements, from each software instance. In step 2306 the system calculates the power allocation and returns it to the process. In step 2307 data about the exchanges in steps 2304-2306 is written to and/or read from table 2200. In step 2308, N is incremented and the process loops back to step 2303 until all cores in the array have been addressed, in sequence. If, in step 2303, the full sequence of units has been addressed and N becomes greater than P (YES), the process moves to step 2309, where the system calculates the power used, the desired power, and the available power for all units that were addressed in steps 2304-2306. In step 2310 power is allocated, and in step 2311 the system negotiates with PSU 2102 about available power or available additional power, and then in step 2312 the system updates data in table 2200. The process may end at step 2313, and then it may start again based on some pre-set timer or on triggering by a change in power requirements or priorities. In other cases, the process may be set to continuously loop back to step 2302.

In the current disclosure as described in the discussions of FIGS. 10-12, a system 2100 has a power allocation that it needs to manage. Each processor is allocated a certain base capacity and must request more capacity from a central resource manager. In addition, the central resource manager can signal the processor that it requires it to release capacity (either urgently or more slowly). It is clearly possible for the central resource manager to be duplicated for redundancy and for the managers to remain synchronized. Note that because the power manager controls the power state of the processor it can alter the actual load that is imposed, hence the available system capacity can be used to alter the power state of the processor. This feature is key to this invention, as the system can never over allocate capacity without running the risk of a "brown out." In addition, the current invention permits consideration of a situation where an amount of capacity is only allocated for a fixed period of time and must be renewed periodically.

Figure 13:
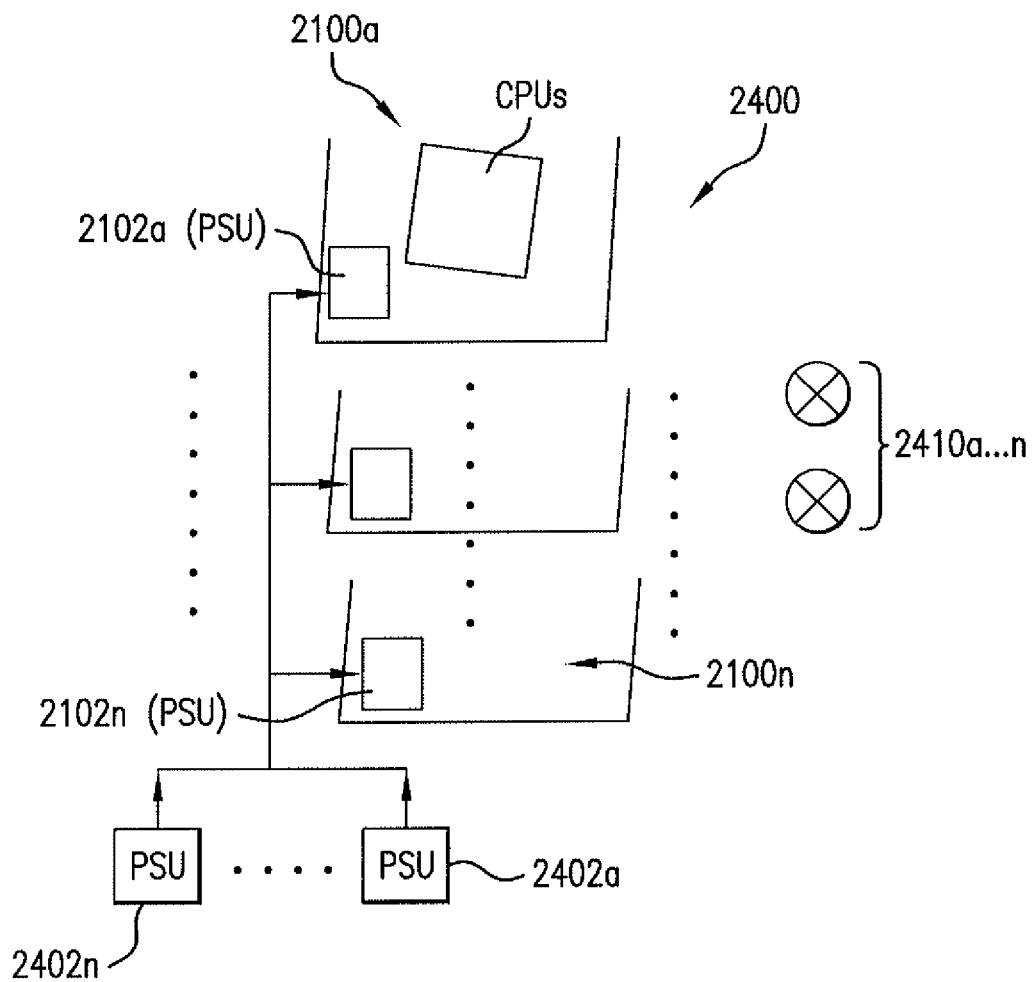
FIG. 13 illustrates an example of a larger power management system.

FIG. 13 shows a simplified overview of an exemplary larger power management system 2400. In this example, multiple installations, typically printed circuit boards, of the type of system shown as system 2100 are stacked vertically (although it is clear that such system multiples may be arranged vertically, horizontally, sequentially, networked, or in any other way). Each system 2100a-n has CPUs 2101a-p and PSU 2102, so that in system 2400 there are PSUs 2102*a-n*. System 2400 also contains air conditioning or cooling and heat sensors 2410*a-n* and master PSUs 2402*a-n*. In this example, the variable range a-n for PSU 2402*a-n* simply indicates a variable, finite numeric quantity, and should not be construed to be an exact number. Depending on the total requirements of PSUs 2102*a-n*, a variable number of PSUs 2402*a-n* may be turned on or turned off; thus keeping the system running optimally and reducing problems of overheating.

Figure 14:
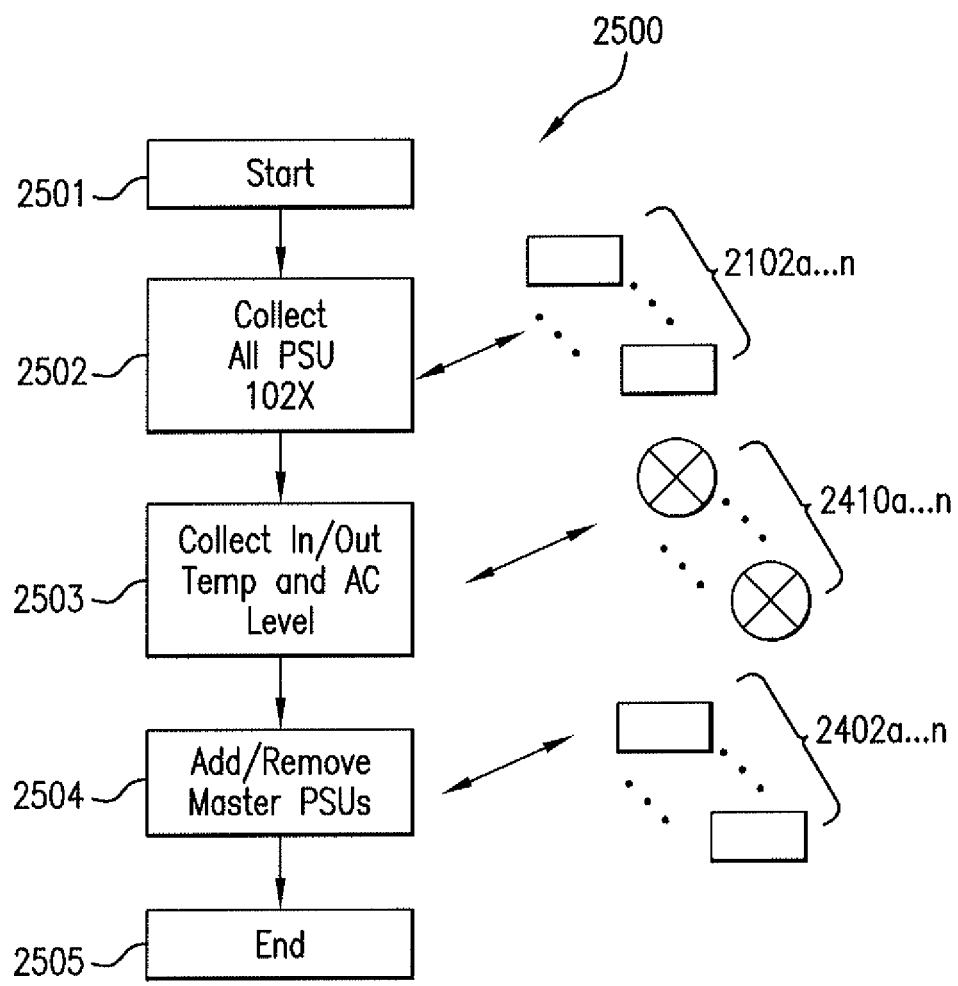
FIG. 14 illustrates an exemplary process for system level power management.

FIG. 14 shows an exemplary process 2500 of the system-level management software, according to one embodiment of the present invention. In essence, process 2500 is similar to process 2300. Additionally incorporated are controls of the air conditioning or cooling and heat sensors 2410*a-n*. In step 2501 the system starts, and in step 2502, it collects all data from PSU 2102*a-n*. In step 2503 the system assesses outside and inside temperatures of each PSU 2102*a-n* and the current heat loads, as well as available air conditioning or cooling performance. In step 2504 additional main PSUs are accordingly added or removed, and new power ceilings are distributed to CPUs 2101*a-n*. In step 2505 the process ends.

In some cases several of the nodes in a system may require greater performance (based on loading). The individual power managers request capacity and it is granted by the central resource manager (CRM) (for example, 50 nodes request 5 units of extra capacity allowing full execution). If other nodes request the same capacity, the CRM can similarly grant the request (assuming that the peak loads do not align, or it may over allocate its capacity).

In the event of a power supply failure, the CRM detects such. The backup battery, or any other suitable energy reserve, including but not limited to mechanical storage (flywheel, pressure tanks etc.) or electronic storage (all types of capacitors, inductors etc.), here all jointly referred to a "backup battery", is capable of supplying power for 100 ms at peak load, so the CRM has 100 ms to reduce the capacity to the new limit of 450 units (actually it has double that this time if the battery can be fully drained, because part of the load may be supplied by the single functioning power supply). The CRM signals each power controller in each processor that it must reduce its usage quickly. This operation takes a certain amount of time, as typically the scheduler needs to react to the lower frequency of the system; however, it should be achievable within the 100 ms. After this point each processor is going to be running at a lower capacity, which implies slower throughput of the system (each processor has 4.5 units of capacity, which is enough for minimum throughput).

Further adjustment of the system can be done by the CRM requesting capacity more slowly from some processors (for example moving them to power down states) and using this spare capacity to increase performance in nodes that are suffering large backlogs. In addition, in an aggressive case, the backup battery can have some of its energy allocated for short periods to allow peak clipping (the processor requests increase capacity and is granted it, but only for a few seconds).

A similar mechanism can be used to allocate cooling capacity (although the longer time constants make the mechanism easier).

A less aggressive system can allocate more total power and have more capacity after failure; while more aggressive systems can allocate less total power and not allow all processors to run at full power even in the situation where redundancy is still active. More complex redundancy arrangements can be considered (e.g., N+1), etc. The key is that capacity is allocated to different processors from a central pool and the individual processors must coordinate their use.

For a system where the individual processors are smaller and have better low power modes (i.e., bigger differences between high and low power) this approach is even more applicable. Communication to the CRM can be done by any mechanism. The requirement is that it must be quick so that the failure case time constant can be met, at least for most of the nodes. It's likely that Ethernet packets or messages to board controllers are sufficient.

Communications Features

A system and a method and architecture that allow many processors to share limited communication resources with efficient power and speed, as well as chip real estate and power consumption are provided. In general terms, this goal is achieved by a variety of changes to typical system architecture, signified by a typically chip internal (so called on-board, but sometimes system internal) virtualized communication fabric added between the multi-CPU cores (referred to as "the cores") and the external communication ports for communicating with the outside world, both to external sources and to other multi-processor chips in a large network. Typically, such networks are organized as trees, fat trees, meshes, hypercubes, or toroids, allowing each chip to communicate with its neighbors.

Figure 15:
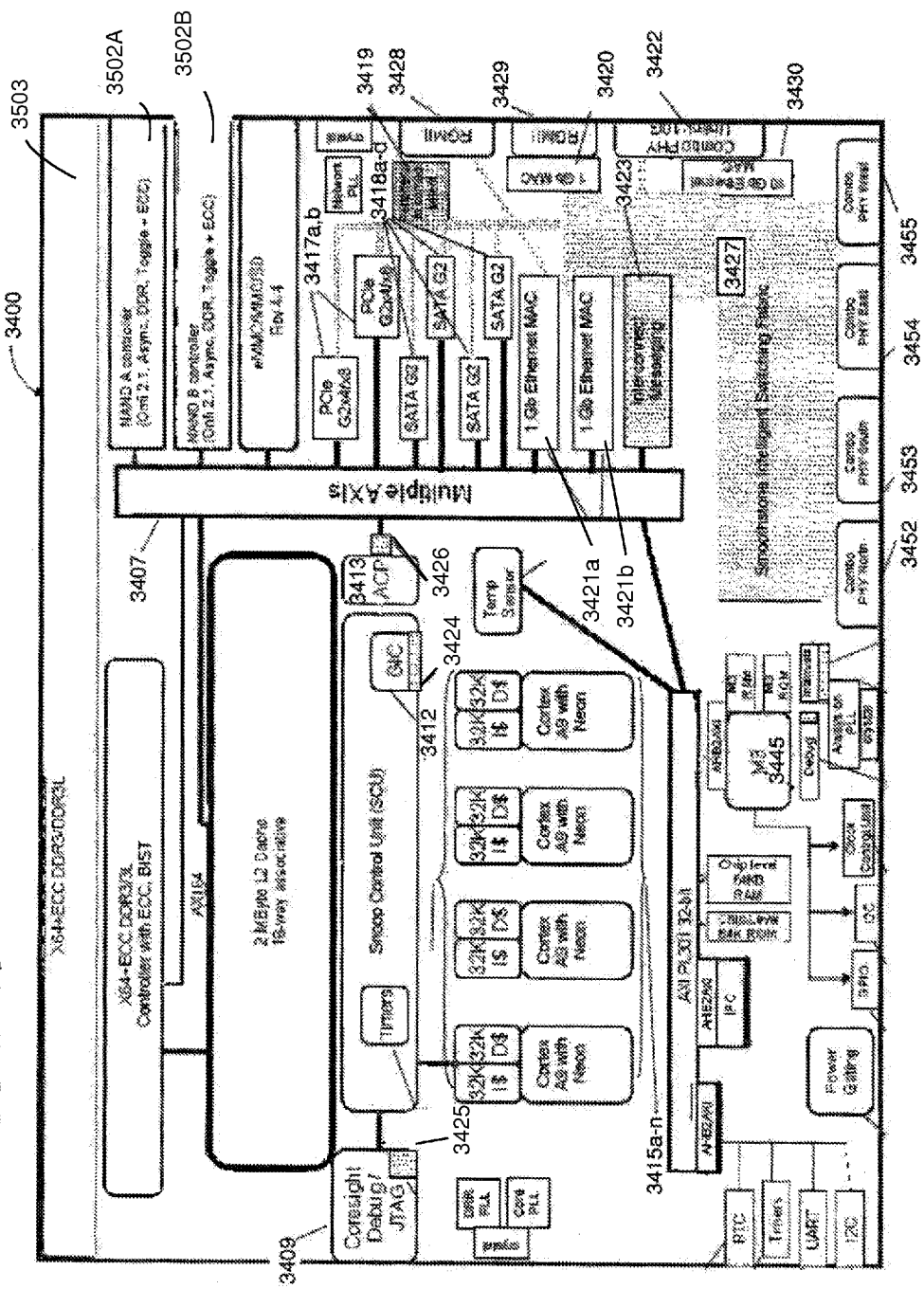
FIG. 15 illustrates an architectural overview of a multiprocessor chip.

FIG. 15 shows a midlevel architectural overview of a multiprocessor chip 3400 according to one embodiment. The multiple processor cores 3415*a-n* are, in this example, ARM Cortex A9, including the ARM NEON SIMD processor. Multiple communication ports 3407 connect to various devices, which are discussed in greater detail below. An auxiliary processor 3445, such as a ARM Cortex M3, is used to power manage the processors 3415*a-n* and to wake them up, let them sleep, or put them to sleep as needed, as well as to manage voltage/frequency scaling of the processor cores 3415*a-n* for load-driven power management. An intelligent switching fabric 3427 connects one or more peripheral elements 3417-3423 on one side and the actual ports 3428, 3429, 3430 and 3452-3455 on the other side. This switching fabric, which is discussed in greater detail below, allows various different elements to be used in different ways. For example, to reduce the number of ports connected, a communication media access control (MAC), such as MACs 3421*a* and 3421*b*, actually is split in half, which is described in greater detail in reference to FIG. 17. In another example of the function of the switching fabric, pending communication requests are managed by the auxiliary processor 3445, which is intricately involved in managing the switching fabric. The switching fabric allows the processor(s) 3415*a-n* to go into a sleep mode or to enter power down mode, while the auxiliary processor responds to communication requests for those processors that are asleep or off, and keeps those requests hanging in the switching fabric until the processors are started again after which the auxiliary processor 3445 then lets the processors 3415*a-n* receive the data. Of particular use are the interfaces 3452-3455, which connect these chips to the neighboring chips. Elements 3424, 3425 and 3426 are extended beyond their respective standard functional parts as discussed throughout this document, namely an ARM® generic interrupt controller GIC 3412, a debugging and testing unit Coresight Debug/JTAG section 3409, and an accelerator coherence port (ACP) 3413 that all help maintain memory and I/O coherence, allowing the auxiliary processor core to interact "invisibly" with all kinds of aspects involved with both power management and communication management to effect the use of the novel switching fabric 3427.

Further, in another aspect, contained in the novel parts are local and system power management and power optimized communication fabric, with support of the auxiliary processor core 1445. It is used to selectively make change in power states of processor cores, as they may not be needed, or as forced by the global power management described earlier. The auxiliary processor core 1445 is used to intercept, with help from the routers and the other enhanced s arts alone or in groups, for example, messages directed to a processor. It determines whether the I/O, interrupts, or messaging are targeting a suspended processor, and if so, it wakes up the requested processor and suspends the request long enough for a recovery of the core, completely transparent to the requestor. Because the main processors (A9s in this example) share memory, caches, I/O, and the OS kernel, they can be switched from task to task pretty easily, allowing execution of a task on a non-sleeping CPU rather than waking up a CPU, provided sufficient processing power is available. In yet another novel aspect, as just touched upon, virtualization and use of distributed storage volumes, distributed flash, and distributed caching can be used to optimize power consumption and reduce delays, by invoking alternative CPUs or in some cases a redundant copy in another chip, thus avoiding waking up (changing power state(s)) of the entire chip by a request rather than starting up sleeping ones, as discussed throughout.

Figure 16:
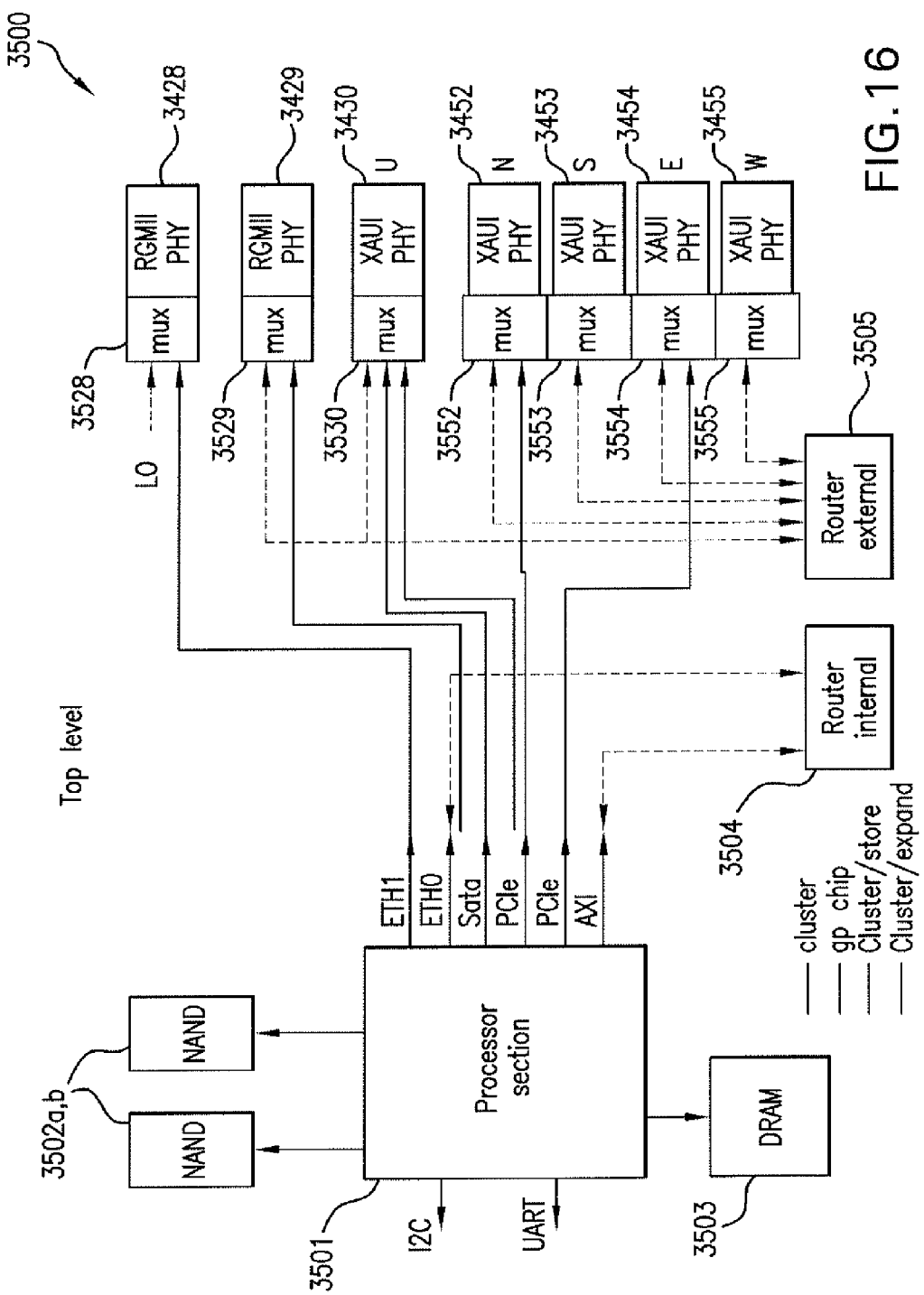
FIG. 16 illustrates different paths that can be created within the switching fabric shown in FIG. 15.
Figure 17:
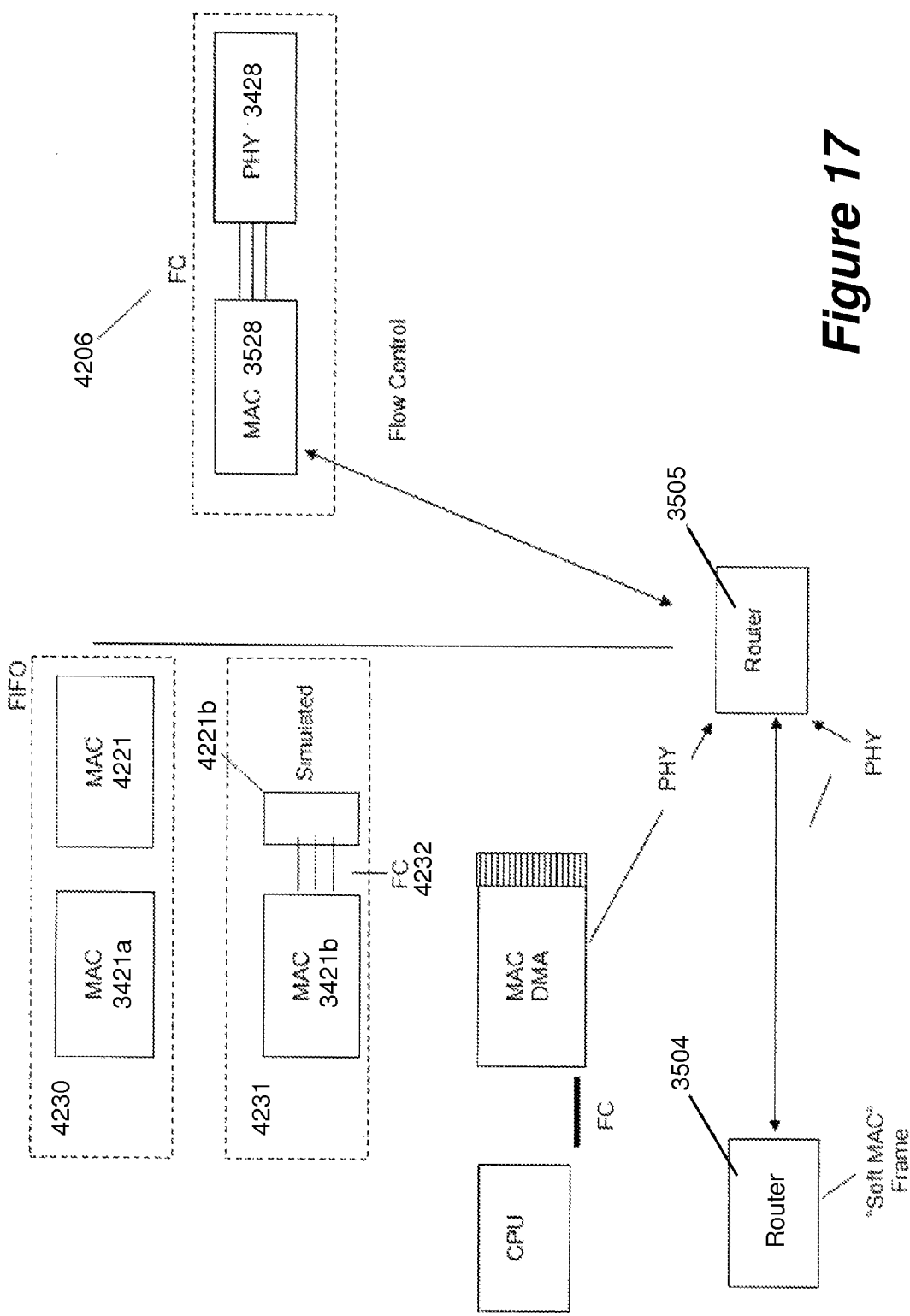
FIG. 17 illustrates an embodiment of how the switching fabric shown in FIG. 15 can be configured and how its elements can interact.

FIGS. 16 and 17 show various aspects of the switching fabric 3427. FIG. 16 shows different paths that can be created within the switching fabric 3427, as controlled by a set of routers 3504 and 3505, with one router for internal communications and the other router for external communications, respectively. The routers themselves are typical in such a system, for internal routing and external routing respectively. These routers are primarily responsible for arbitrating and managing the control signals of the various data paths between the "processor side" 3501 of the MACs (or other communication units) and the external faced side of those communication units 3528-3555. The processor side 3501 is coupled to one or more types of information storage devices (e.g., dynamic random access (DRAM) memory 3503 and Not And (NAND) memory via NAND memory controllers 3502*a*, 3502*b*). Although distinct data paths are shown, not all paths exist as physical connections. Rather, they can be made available as part of the logical switching.

FIG. 17 shows an embodiment of how the switching fabric can be configured and how elements thereof can interact. On the left side, for example, are MAC 3421 (as an example of a processor side MAC) and a mirrored partial MAC 4221. Rather than having two complete MACs back to back as shown at section 4230, only a partial MAC 4221*b* is mirroring CPU side MAC 3421*b* in section 3231. The remaining functionality, mostly processor-looking registers, is missing, as the switching fabric 3427 runs on hard defined patterns, and hence does not need all the options. Similarly, the outward-looking MAC/PHY block 3528 and 3428, for example, is also implemented as a simulated counterpart toward the switching fabric, with a partial MAC and multiplexer 3528 complementing partial MAC 4221*b* into a transparent communication channel. Flow controls 4232 and 4206 are controlled by the respective routers 3504 and 3505, hence allowing the switching fabric 3427 to clear the shared data lines to avoid collisions or loss of data.

Reflection of Interrupts Between Application Processors and their Associated Power Microcontrollers In reference to FIG. 15, the SOC reflects interrupts between application processors and their associated power microcontrollers. The GIC reflects the processor 3415*a-n* interrupt lines to the auxiliary processor to allow the auxiliary processor to wake the processor 3415*a-n* cores when an interrupt needs to be processed, as previously discussed, as well as in other locations herein.

Further, if an individual core is in dormant mode, then just sending the interrupt to the core has little effect. Thus the system needs to monitor the nIRQOUT and nFIQOUT signals so the interrupt goes to the GIC and is then reflected out of those pins—this signals the auxiliary processor 3445 (i.e., also referred to as a power management unit (PMU)) to wake up the core.

If the whole processor subsystem is powered down, the interrupts are steered to the auxiliary processor where the event is seen. Most events cause a wakeup of the subsystems, but the interrupt is not removed. Rather, it is retained and once a processor wakes up and is ready to start, the interrupt is taken directly by the GIC. In some cases, interrupts are turned into level sensitive (or masking) to the microcontroller so as not to bury the microcontroller in interrupts.

The auxiliary processor 3445 enables visibility into interrupts for a particular one of the processor cores 3415*a-n* when that particular one of the processor cores 3415*a-n* goes into low power state, and then the auxiliary processor 3445 knows to wake up that particular one of the processor cores 3415*a-n*. In some cases, interrupts are turned into level sensitive interrupts (or masked) to the auxiliary processor 3445 to not bury the auxiliary processor 3445 in interrupts and overwhelm the system.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A system on a chip (SoC) configured for providing server functionality to one or more computing systems, comprising:
a plurality of processing cores each capable of being transitioned between a plurality of power states;
an interrupt controller coupled to each one of the processing cores; and
at least one auxiliary processor coupled to each one of the processing cores through the interrupt controller, wherein the interrupt controller is configured to receive an interrupt directed to a first one of the processing cores that is in an inactive state that inhibits processing of interrupts, wherein the interrupt controller is configured to provide the interrupt to the at least one auxiliary processor, and wherein, in response to receipt of the interrupt, the at least one auxiliary processor is configured to cause at least one of the processing cores to transition to an active state that enables processing of the interrupt;
wherein the interrupt comprises a communication request, and wherein the at least one auxiliary processor is configured to send a response message to a node from which the communication request was received, and wherein the at least one auxiliary processor is further configured to keep the communication request pending in a switching fabric until the communication request is provided to one of the processing cores.

2. The system on a chip of claim 1, further comprising:
a communication media access control (MAC) structure coupled to at least one of the processing cores, wherein the communication MAC structure includes a central processing unit (CPU)-side MAC mirroring a fabric-side communication MAC.

3. The system on a chip of claim 1, wherein the at least one auxiliary processor is configured to cause the communication request for the first one of the processing cores to be held in the switching fabric while the first one of the processing cores is in the inactive state, and wherein the at least one auxiliary processor is further configured to provide the communication request to the first one of the processing cores in response to a transition of the first one of the processing cores to the active state.

4. The system on a chip of claim 2, wherein:
the at least one auxiliary processor is configured to cause the communication request to be held in the switching fabric in response to a determination by the at least one auxiliary processor that the first one of the processing cores is in the inactive state;
the at least one auxiliary processor is configured to assess the processing cores to determine a second one of the processing cores that is in the active state; and
the at least one auxiliary processor is configured to cause the communication request to be delivered to the second one of the processing cores such that the second one of the processing cores can perform a task initiated by the communication request, wherein delivery of the communication request to the second one of the processing cores is based on the determination that the second one of the processing cores is in the active state.

5. The system on a chip of claim 1, wherein:
the at least one auxiliary processor is configured to enable each one of the processing cores to be selectively transitioned between the active state and the inactive state; and
the at least one auxiliary processor is configured to cause the communication request to be provided to the first one of the processing cores in response to a transition of the first one of the processing cores from the inactive state to the active state.

6. The system on a chip of claim 5, further comprising a communication media access control (MAC) structure coupled to at least one of the processing cores, wherein the communication MAC structure includes a central processing unit (CPU)-side MAC mirroring a fabric-side communication MAC.

7. The system on a chip of claim 6, further comprising:
one or more flash memory controllers coupled to at least one of the processing cores, wherein the one or more flash memory controllers are configured to enable one or more flash memory devices to be locally connected to and accessible by at least one of the processing cores.

8. The system on a chip of claim 1, further comprising:
one or more flash memory controllers coupled to at least one of the processing cores, wherein the one or more flash memory controllers are configured to enable one or more flash memory devices to be locally connected to and accessible by at least one of the processing cores.

9. The system on a chip of claim 8, wherein:
the at least one auxiliary processor is configured to cause the communication request to be held in the switching fabric in response to a determination by the at least one auxiliary processor that the first one of the processing cores is in the inactive state;
the at least one auxiliary processor is configured to assess the processing cores to determine a second one of the processing cores that is currently in the active state; and
the at least one auxiliary processor is configured to cause the communication request to be delivered to the second one of the processing cores.

10. The system on a chip of claim 9 wherein:
the at least one auxiliary processor is configured to assess the second one of the processing cores to determine an available processing power capacity prior to a delivery of the communication request to the second one of the processing cores; and
the at least one auxiliary processor is configured to cause the communication request to be delivered to the second one of the processing cores in response to a determination that the second one of the processing cores has sufficient processing power available to perform a task initiated by the communication request.

11. A system on a chip, comprising:
a plurality of processing cores each capable of being transitioned between a plurality of power states;
an interrupt controller coupled to each one of the processing cores;
one or more external ports configured to allow communication of information between the processing cores and one or more computing systems;
a switching fabric coupled to at least one of the processing cores and to the one or more external ports; and
at least one auxiliary processor coupled to the switching fabric and to each one of the processing cores, wherein the at least one auxiliary processor is coupled to each one of the processing cores through the interrupt controller, wherein the interrupt controller is configured to provide an interrupt to the at least one auxiliary processor, and wherein, in response to receipt of the interrupt by the at least one auxiliary, the at least one auxiliary processor is configured to cause at least one of the processing cores to transition from an inactive state that inhibits processing of the interrupt to an active state that enables processing of the interrupt;
wherein the interrupt comprises a communication request, and wherein the at least one auxiliary processor is configured to send a response message to a node from which the communication request was received, and wherein the at least on auxiliary processor is further configured to keep the communication request pending in the switching fabric until the communication request is provided to one of the processing cores.

12. The system on a chip of claim 11, wherein:
the at least one auxiliary processor is configured to enable each one of the processing cores to be selectively transitioned between the active state and the inactive state;
the at least one auxiliary processor is configured to receive the communication request for a first one of the processing cores while the first one of the processing cores is in the inactive state; and
the at least one auxiliary processor is configured to cause the communication request to be provided to the first one of the processing cores in response to a transition of the first one of the processing cores from the inactive state to the active state.

13. The system on a chip of claim 11, further comprising:
a communication media access control (MAC) structure coupled to the at least one of the processing cores, wherein the communication MAC structure includes a central processing unit (CPU)-side MAC mirroring a fabric-side communication MAC.

14. The system on a chip of claim 11, wherein:
the communication request is directed to a first one of the processing cores, and wherein the at least one auxiliary processor is configured to cause the communication request to be held in the switching fabric in response to a determination by the at least one auxiliary processor that the first one of the processing cores is in the inactive state;

the at least one auxiliary processor is configured to assess the processing cores to determine a second one of the processing cores that is currently in the active state; and the at least one auxiliary processor is configured to cause the communication request to be delivered to the second one of the processing cores such that the second one of the processing cores can perform a task initiated by the communication request.

15. The system on a chip of claim 13, wherein:

the at least one auxiliary processor is configured to enable each one of the processing cores to be selectively transitioned between the active state and the inactive state;

the communication request is directed to a first one of the processing cores, and wherein the at least one auxiliary processor is configured to receive the communication request while the first one of the processing cores is in the inactive state; and the at least one auxiliary processor is configured to cause the communication request to be provided to the first one of the processing cores in response to a transition of the first one of the processing cores from the inactive state to the active state.

16. The system on a chip of claim 13, wherein:

the communication request is directed to a first one of the processing cores, and wherein the at least one auxiliary processor is configured to cause the communication request to be held in the switching fabric based on a determination by the at least one auxiliary processor that the first one of the processing cores is in the inactive state;

the at least one auxiliary processor is configured to assess the processing cores to determine a second one of the processing cores that is in the active state; and the at least one auxiliary processor is configured to cause the communication request to be delivered to the second one of the processing cores such that the second one of the processing cores can perform a task initiated by the communication request.

* * * * *